March 28, 1939.   C. S. SNAVELY   2,152,390
REMOTE CONTROLLING APPARATUS
Filed May 14, 1929   7 Sheets-Sheet 6
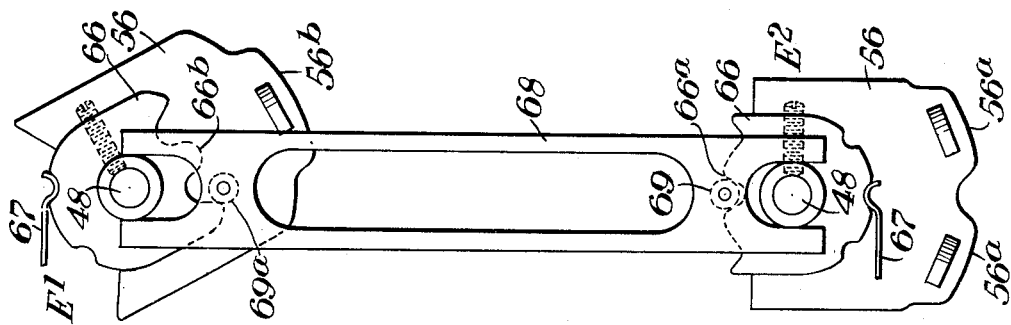
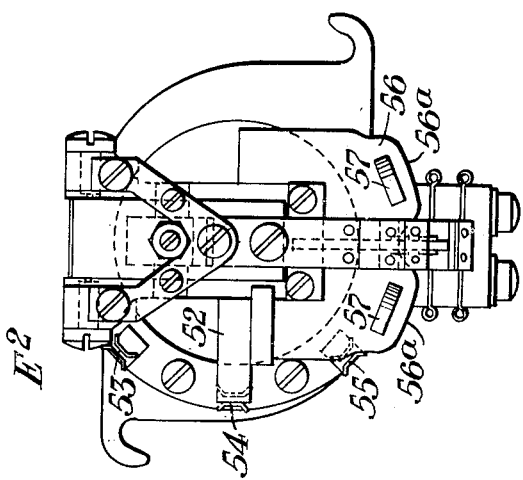
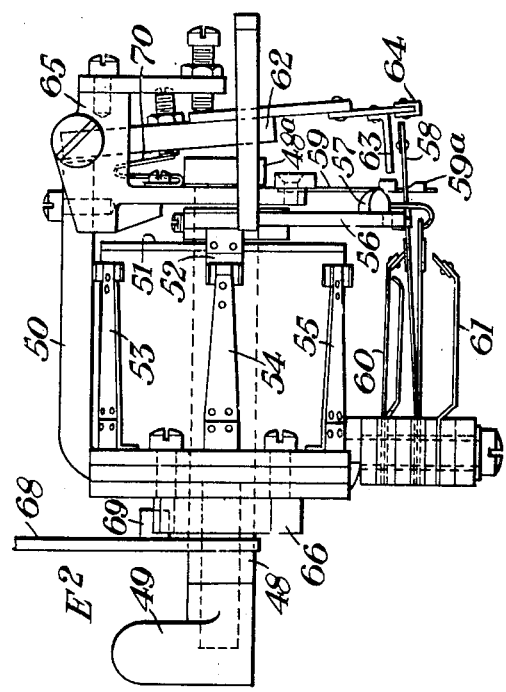
INVENTOR:
C. S. Snavely,
by A. R. Vencill
His Attorney March 28, 1939.

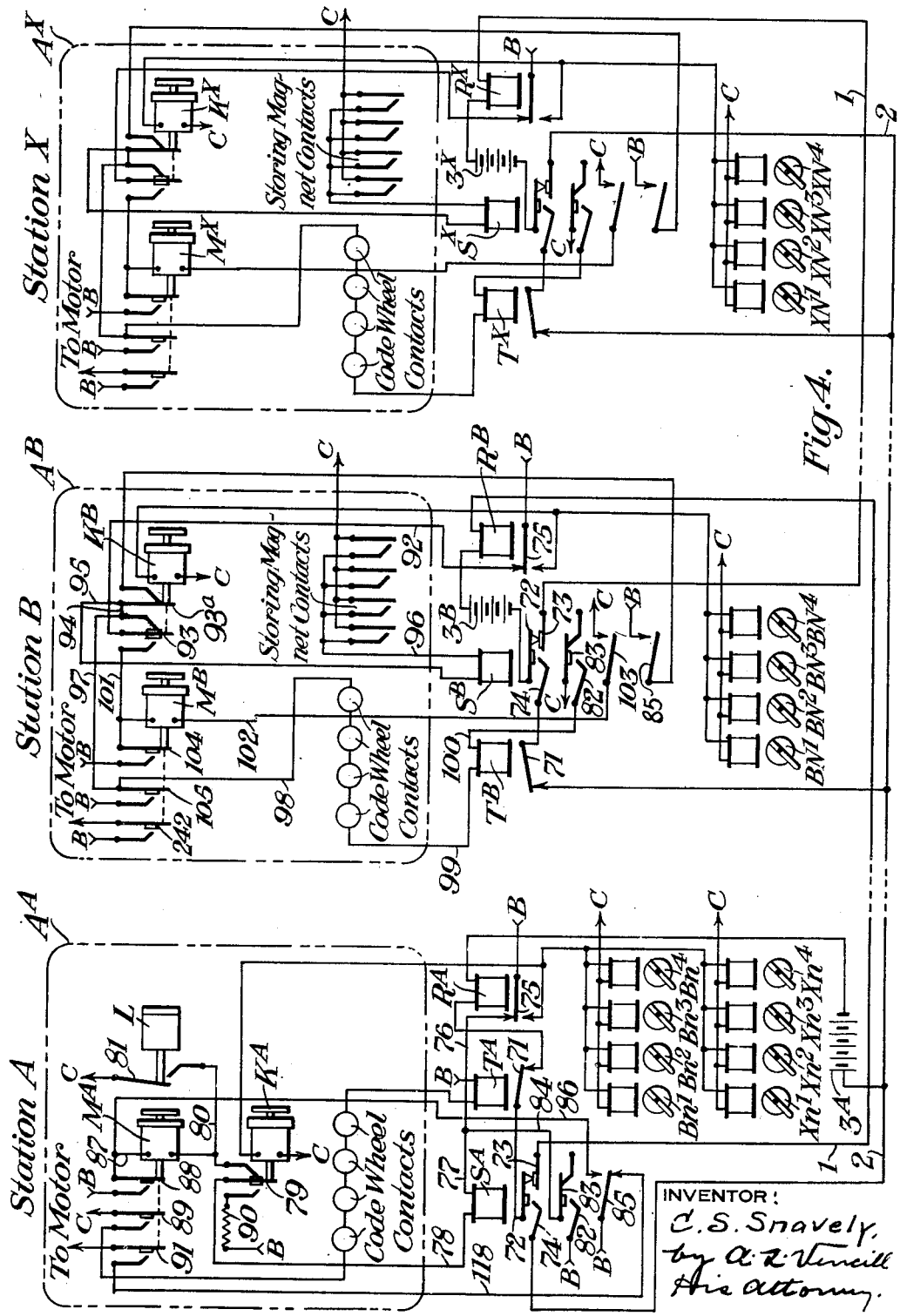

C. S. SNAVELY 2,152,390

REMOTE CONTROLLING APPARATUS

Filed May 14, 1929

7 Sheets-Sheet 7

INVENTOR:
C. S. Snavely,
by A. L. Vincill
His Attorney

Patented Mar. 28, 1939

2,152,390

UNITED STATES PATENT OFFICE 2,152,390

REMOTE CONTROLLING APPARATUS

Clarence S. Snavely, Pittsburgh, Pa., assignor to The Union Switch & Signal Company, Swissvale, Pa., a corporation of Pennsylvania Application May 14, 1929, Serial No. 362,948

72 Claims. (Cl. 246—5)

My invention relates to remote controlling apparatus, and particularly to apparatus for controlling traffic governing devices, such as railway switches and signals, from a remote point. In systems of the type described, it is customary to provide apparatus at a control station, such for example, as a train dispatcher's office, for transmitting control codes for controlling governing devices located at remote stations which may be at a considerable distance from the office. It is usually desirable to provide means actuated by the operation of the governing devices, in response to the control codes, or in response to traffic conditions, for sending indication codes to the control station. I propose to provide a normally closed line circuit connecting the control station and all remote stations and to deliver both the control codes and the indication codes to this line circuit and also to provide means effective when a code is being supplied to the line circuit from any station to prevent the delivery of codes to the line circuit from all other stations. Other features and advantages of my invention will appear from the appended specification.

I will describe one form of remote controlling apparatus embodying my invention, and will then point out the novel features thereof in claims.

Figure 1A:
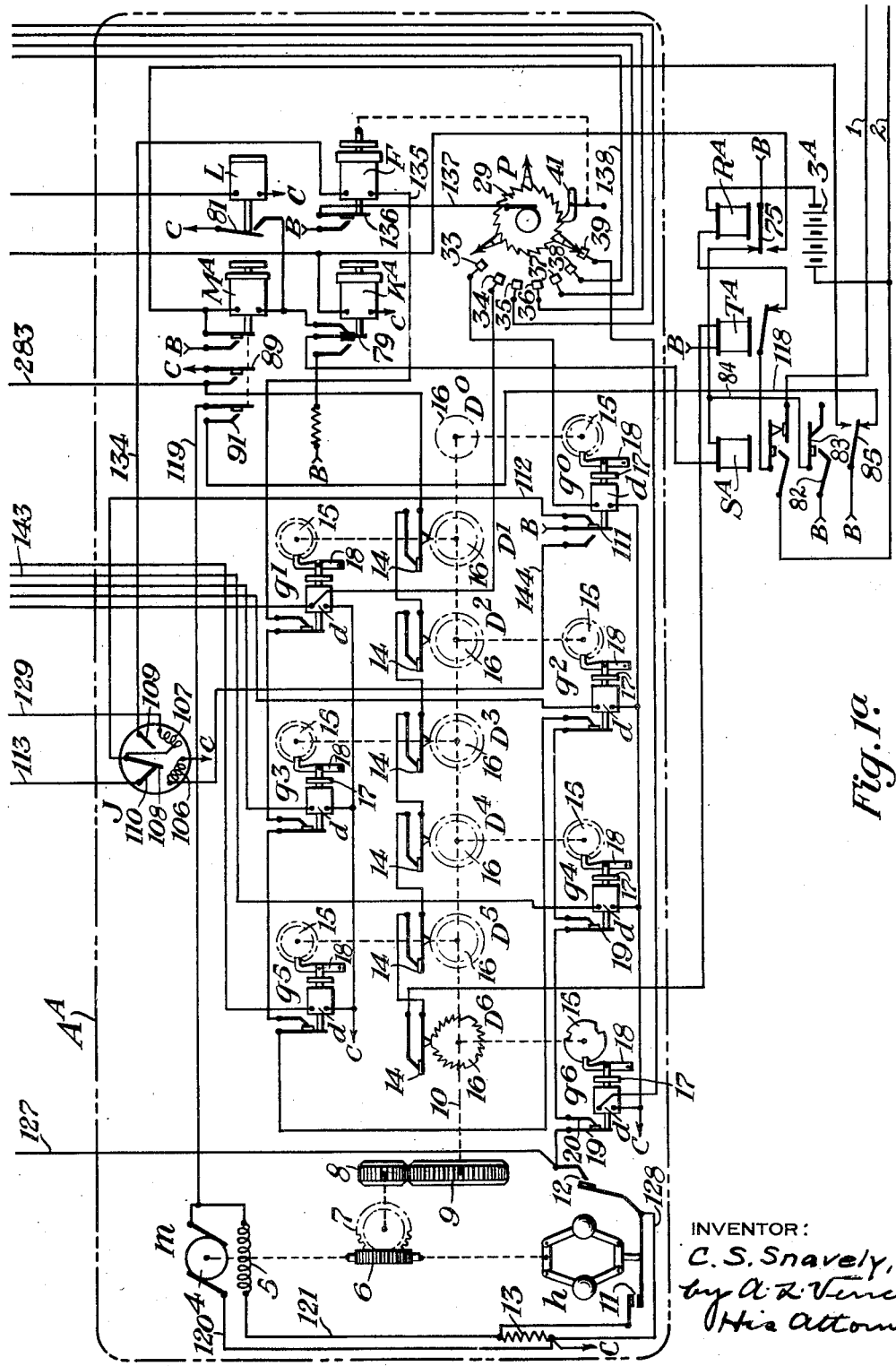
Figure 2:
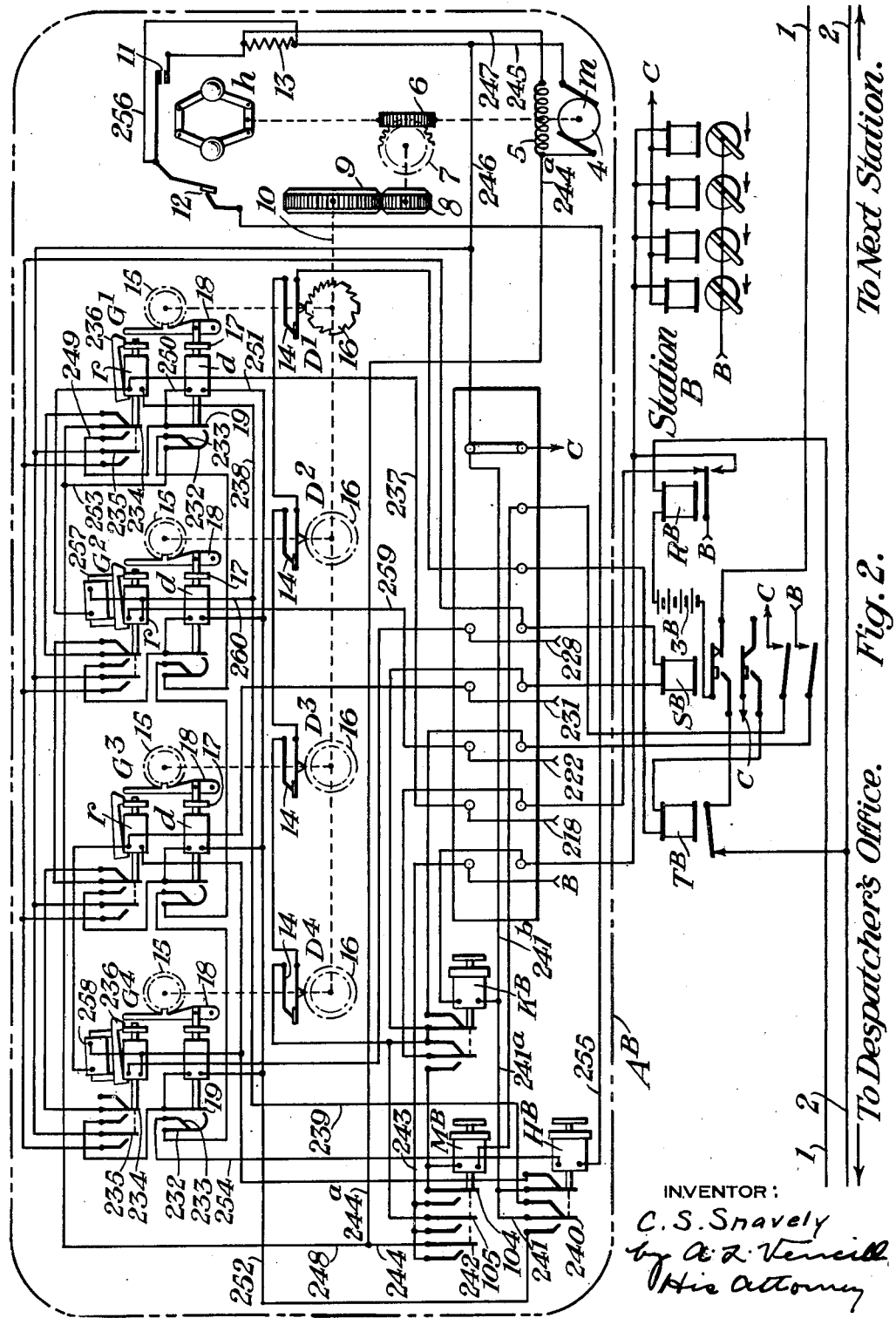
Figure 3:
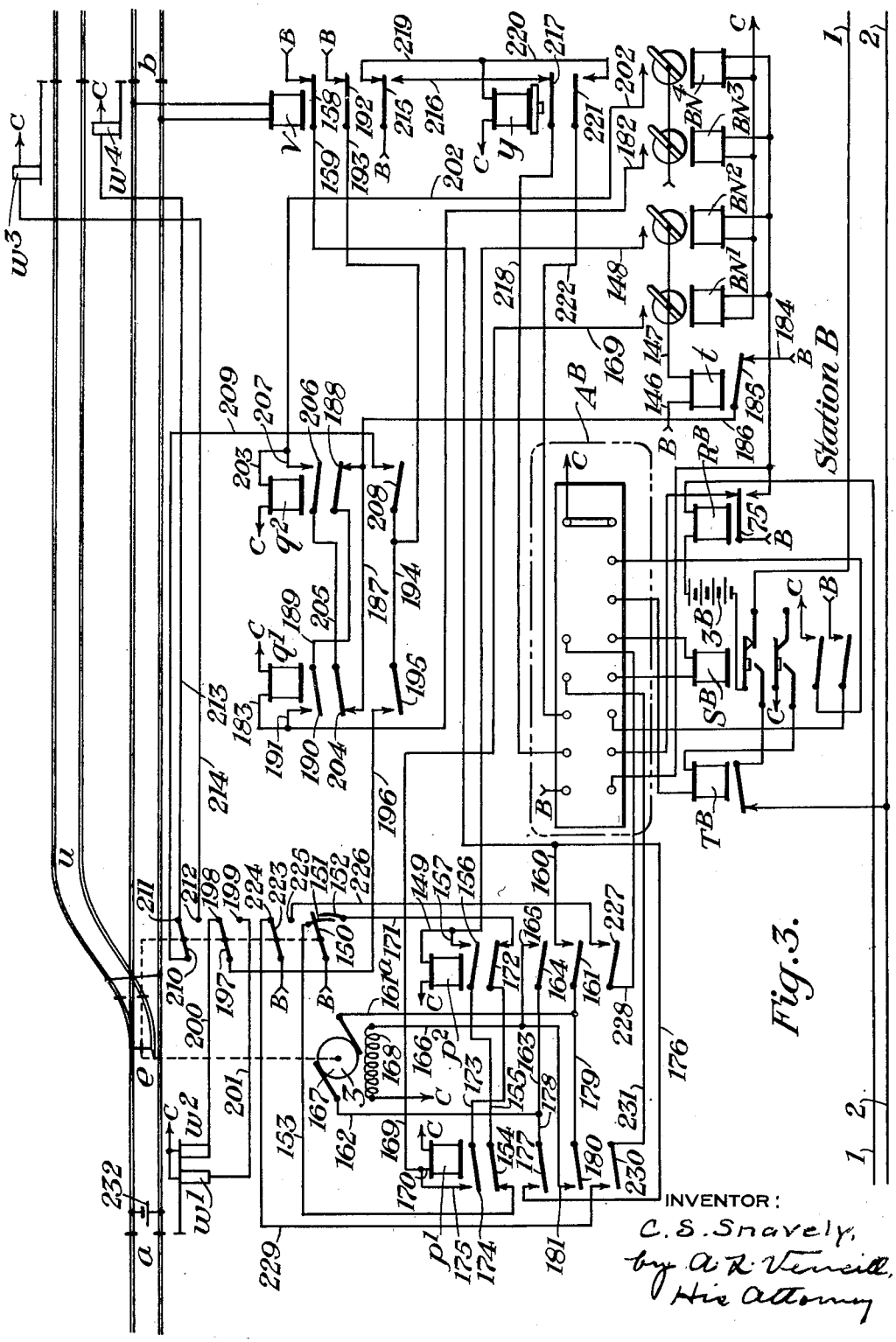
Figures 8, 9:
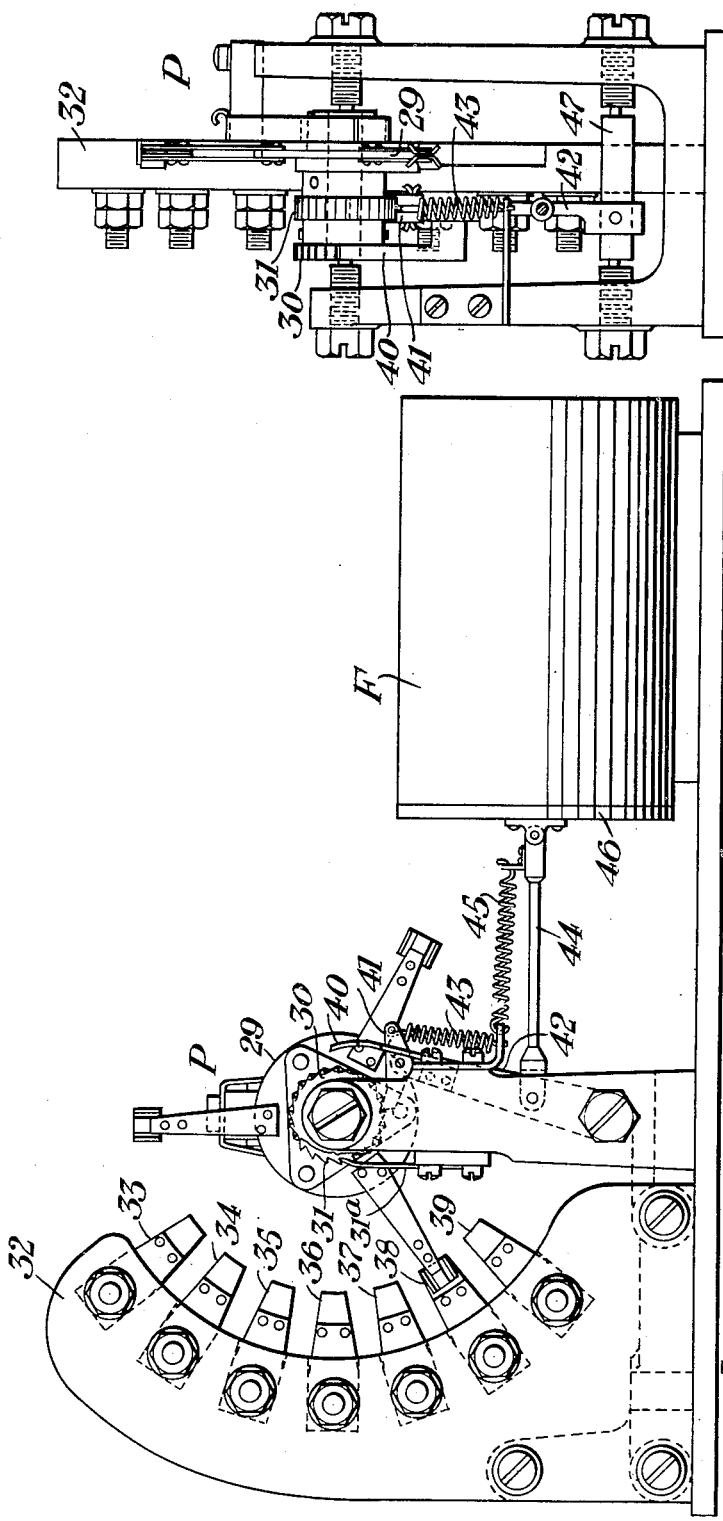

In the accompanying drawings, Figs. 1ª and 1ᵇ, when placed one above the other with Fig. 1ᵇ at the top, form a diagrammatic view showing the equipment necessary at the control station for one embodiment of my invention. Fig. 2 is a diagrammatic view showing one form of remote control equipment for co-operating with the control station equipment shown in Figs. 1ª and 1ᵇ and also embodying my invention. Fig. 3 is a diagrammatic view showing one arrangement of governing devices controlled by the apparatus illustrated in Fig. 2 and also embodying my invention. Fig. 4 is a diagram showing the line circuit between stations and a portion of the apparatus which is at times connected with this line circuit to accomplish line checking and locking in accordance with my invention. Figs. 5 and 6 are detail views showing, in side and end elevation, respectively, one of the switching devices E² shown in Fig. 1ᵇ. Fig. 7 is a diagrammatic view illustrating the apparatus for providing mechanical locking between associated switching devices E¹ and E² shown in Fig. 1ᵇ. Figs. 8 and 9 are detail views showing in front and side elevation, respectively, the stepping contactor P illustrated diagrammatically in Fig. 1ª.

Similar reference characters refer to similar parts in each of the several views.

Referring first to Figs. 1ª, 1ᵇ, 2, 3 and 4, the control station designated as station A is provided with apparatus for controlling traffic governing devices located at a plurality of remote stations, only two of which are shown in the drawings, and which are designated station B and station X. Each station is provided with coding apparatus designated in general by the reference character A with an exponent corresponding to the location. Each coding apparatus A is arranged when actuated to deliver a selected code to a line circuit here shown as made up of line wires 1 and 2, which line circuit extends to all of the stations. One form of coding apparatus similar to the coding apparatus located at each of the remote stations in my present invention is disclosed and claimed in an application Serial No. 254,684, filed by me on February 16, 1928, for Railway traffic controlling apparatus, now Patent No. 2,082,428, granted June 1, 1937.

The coding apparatus $A^A$ located at the control station comprises a motor $m$ having an armature 4 and a field 5, which motor operates a plurality of code wheels. In the form here shown the armature 4 of the motor is operatively connected with a gear 9 through a worm 6, a worm wheel 7, and a pinion 8. The gear wheel 9 is fastened to a shaft, indicated diagrammatically at 10, and journalled in suitable bearings not shown in the drawings. Shaft 10 in turn carries a plurality of code wheels, each designated by the reference character D with a distinguishing exponent, and each made up of a disk 16 provided at its periphery with different combinations of teeth and solidly pinned to a cam 15. These teeth are shown in the drawings on wheel $D^6$ but are omitted from the other code wheels for the sake of simplicity. Each code wheel D is normally coupled with the shaft, by means of some friction device, such for example, as is shown in my previous application, Serial No. 254,684, identified above. With this arrangement, each code wheel and its associated cam would be rotated in response to operation of the motor $m$ if it were not latched in position by the apparatus which I will now describe.

The cam 15 of each code wheel D is controlled by a delivery magnet designated by the reference character $d$ and provided with an armature 17 which controls a pivoted latch 18. The armature 17 is normally urged to the right as shown in the drawings by a contact spring 19 which bears against the left-hand end of the magnet plunger, and the latch 18 is also urged to the right so that the tip of the latch enters a notch in the cam and prevents the rotation of the code wheel. When the delivery magnet d becomes energized, the armature 17 and the latch 18 are moved to the left, thereby withdrawing the tip of the latch from the notch in the cam 15, and permitting the code wheel to be rotated if the motor m is operated. At the same time a normally closed back contact 19—20 controlled by the magnet is opened. It should be pointed out that after the latch 18 has once been operated to release the cam, the engagement of the latch with the edge of the cam prevents the return of the latch to its normal position until the code wheel has rotated far enough to bring another notch into registration with the latch. Each code wheel D controls a normally closed contact 14 in such manner that when the code wheel is rotated the contact is periodically opened in accordance with the teeth in the code wheel. I propose to construct the several code wheels in such manner that each code wheel, when operated, causes a distinctive operation of the associated contact 14 so that a circuit including the contact will then receive a distinctive code element.

It should be pointed out that the coding apparatus here contemplated is intended to control step-by-step selectors of the type known to the art as "Gill" selectors. Selectors of this type are intended to be operated by codes each made up of a plurality of digits. For example, the selectors may be operated by codes having five digits, the first of which always contains the same number of impulses, which number is one greater than the number of impulses in any other digit of the code. The purpose of this first or clearing digit is to make sure that the selector always commences its stepping operation from its normal position. The last digit of each code is the operating digit, and always consists of a single impulse. The remaining digits of the code are variable, to produce distinctive codes, and in the present instance each of these digits may consist of any number of impulses from 1 to 5.

In order to create codes of the type just described, I propose to furnish each of the code wheels D with teeth which will operate the associated contact to deliver distinctive code elements containing from one to six impulses. By operating selected ones of the code wheels in a selected order, I can therefore produce any desired code.

Each of the code wheels D is controlled by a delivery magnet d and each code wheel with its associated magnet and contact will be referred to collectively as a coding unit, there being as many coding units in the coding apparatus A as are required to provide the different numbers of impulses for the several code elements required. Each coding unit is designated by the reference character g, with a distinguishing exponent. As shown in the drawings, code wheel D⁶ is provided with three groups of teeth, each having six teeth and the associated cam 15 is therefore provided with three notches for engagement with the latch 18 of the delivery magnet. The remaining code wheels, having fewer teeth in each group, may have a greater number of notches in the associated cams, so that a smaller angular movement of the code wheel is necessary between successive lockings by the corresponding delivery magnet.

The unit g⁰ is similar to the other units of the coding apparatus, but has no contact 14. The cam 15 is provided with a plurality of notches for engagement with the latch 18, so that, if delivery magnet d of this unit is energized while the motor m is operating, the latch 18 is withdrawn, and a brief interval of time elapses before the latch enters the next notch in the cam. The purpose of unit g⁰ will be described hereinafter.

The coding apparatus A^A also comprises a stepping contactor designated by the reference character P and shown diagrammatically on Fig. 1ᵃ, but illustrated in detail in Figs. 8 and 9. It will be seen from the latter drawings, that this stepping contactor comprises a rotatable spider 29 having a plurality of radially extending arms here shown as three in number. The arms of the spider are connected together electrically, and the spider as a whole is arranged to be rotated in a step-by-step fashion by the apparatus which I will now describe. Rigidly attached to the spider are two ratchet wheels 30 and 31 having their teeth facing in opposite directions. As best shown in Fig. 8, a fixed pawl 31ᵃ engages wheel 31 and prevents rotation of the spider in a counter-clockwise direction as viewed in this figure. The spider is operated by a magnet F having an armature 46 attached to a link 44 which drives an operating arm 42. The arm 42 is attached to a spindle 47 which is pivoted to allow oscillation of the operating arm. A spring 45 having one end attached to a fixed bracket and the other end attached to link 44 biases the armature 46 to a position in which a ratchet 40 attached to the arm 42 engages the ratchet wheel 30 and locks the spider 29 in position. The arm 42 also carries a pawl 41 which is pivoted in the tip of the operating arm 42 and is biased by means of a spring 43 to a position in which the tip of the pawl engages the teeth of the ratchet wheel 31. When the magnet F is energized, armature 46 moves to its right-hand position in which it is shown in Fig. 8, thereby swinging armature 42 to the right, withdrawing the ratchet 40 from the teeth of ratchet wheel 31, and stepping the pawl 41 back one tooth on the ratchet wheel 30. When the magnet F is next de-energized, spring 45 draws the armature, and hence the operating arm 42, to the left, as seen in Fig. 8, thereby rotating the spider 29 by an amount represented by one tooth of the ratchet wheel 30. It will be noted that at the conclusion of this stroke of the operating arm the ratchet 40 will then engage one tooth of the ratchet wheel 31 so that when the magnet F is de-energized the spider is locked positively against rotation in either direction. It will be seen from the foregoing that if magnet F is alternately energized and de-energized, the spider 29 of the stepping contactor will be rotated one step for each energization and de-energization of the magnet. The contactor P also comprises a supporting member 32 preferably of insulating material and carrying a plurality of fixed segments, extending radially inward toward the spider 29 and designated by the reference characters 33 to 39, inclusive. The parts of the stepping contactor are so proportioned that the interval between the contact segments is equal to the distance through which the spider 29 is stepped by one energization and de-energization of the magnet F. As shown in the drawings, the contactor comprises three arms on the spider, and seven fixed segments, one of which is at all times engaged by one of the arms of the spider.

Referring now to Fig. 1ᵃ, it will be seen that the spider 29 is connected with terminal B of a source of energy not shown in the drawings over a front contact of the operating magnet F of the stepping contactor P. When the magnet F is energized, therefore, terminal B is connected with a selected one of the fixed segments 33 to 39 of the stepping contactor, depending upon the position of the spider 29. If the spider 29 is in engagement with contact 33 the delivery magnet d of unit g⁰ has one terminal connected with terminal B over contact 29—33 of the stepping contactor P, and since the other terminal of this delivery magnet is always connected with the remaining terminal C of the same source, the delivery magnet will be energized under these conditions. In similar manner, if contact 29—34 of stepping contactor P is closed and if magnet F is energized, the delivery magnet d of unit g¹ is energized. If, however, contact 29—39 of the stepping contactor is closed and if magnet F is energized, the delivery magnet d of coding unit g⁵ is energized. If magnet F is energized when the spider 29 of the contactor P engages one of the remaining segments 35, 36, 37 or 38, a selected one of the delivery magnets of the coding units g¹, g², g³, g⁴, g⁵ is energized depending upon the conditions of a series of code selector relays, each designated by the reference character Q with a suitable distinguishing prefix and exponent and shown near the bottom of Fig. 1ᵇ. The code selecting relays Q are controlled in part by manually operable switching devices which are located at the control station and are for convenience grouped in separate panels, one panel for controlling the apparatus located at each remote station. For example, as shown in the drawings, there are two panels, one for station B and one for station X, which stations are illustrated on Fig. 4. Each panel is provided with two manually operable switching devices E¹ and E² with prefixes corresponding to the panel and which devices will be described in detail hereinafter. The switching devices E of each panel control a plurality of the code selecting relays Q referred to hereinbefore, and as here shown, four of these code selecting relays are provided for each panel. The purpose of the code selecting relays Q is to connect selected ones of the segments 35, 36, 37 and 38 of the stepping contactor P with selected ones of the delivery magnets d of coding units g¹, g², g³, g⁴ and g⁵. For convenience, the terminals of the delivery magnets may be brought out to bus bars extending below the series of code selecting relays, and the leads from the segments of the stepping contactor P may be brought out to bus bars extending above the series of code selecting relays. Each code selecting relay has four contacts, permanently connected to the individual bus bars leading to the segments of contactor P, and which are preferably connected with selected ones of the bus bars leading to the delivery magnet of the coding units by means of screw plugs. With this arrangement it is apparent that the connections controlled by any code selecting relay may conveniently be altered by the simple expedient of changing the position of the screw plugs associated therewith.

I will now proceed to describe the switching devices E provided at the control station for the manual control of the coding apparatus Aᴬ. Referring to Figs. 5 and 6, I have illustrated one of these switching devices in detail, and it will be apparent from an inspection of these figures that the switching device comprises a manually operable lever 49 controlling a rotatable shaft 48. This shaft is constructed of magnetizable material and passes through a magnetizable member 50 which supports a non-magnetizable bracket 65 in which is pivoted a magnetizable armature 62 normally biased by a spring 70 away from the tip 48ᵃ of the shaft 48. Surrounding the shaft 48 is a winding 51 which is at times energized, as will be explained hereinafter, to draw the armature 62 to the left as viewed in Fig. 5 against the bias exerted by spring 70. Attached to the shaft 48 is a contact arm 52, arranged to engage a selected one of three fixed contacts 53, 54 or 55 depending upon the position of the shaft 48 and lever 49. Also attached to the shaft 48 is a cam 56 of insulating material which is illustrated most clearly in Fig. 6 and is provided with two outstanding projections 57, the purpose of which will become apparent as the description proceeds. The cam 56 controls a contact finger 58, which normally engages a fixed contact 60, but which is arranged to be moved at times into engagement with a contact 61. The contact finger 58 is also controlled by a fixed latch 59 attached to the bracket 65, and provided with a shoulder 59ᵃ effective to hold the finger 58 in engagement with contact 61 after the finger has once been moved to its lower position. The armature 62 carries a trigger 63 for at times engaging the latch 59 to release the finger 58, and the armature also carries a contact tip 64 which may be brought into engagement with a similar tip on the extremity of the finger 58.

As shown in the drawings the lever 49 occupies its middle position and contact 52—54 of the switching device is closed. The winding 51 is assumed to be de-energized so that the armature occupies its right-hand position as shown in Fig. 5 and the contact finger 58 engages contact 60. If, now, lever 49 is moved in either direction, for example, in such direction that contact 52—53 is closed, this movement of the lever causes the cam 56 to depress finger 58 into engagement with contact 61. It will be noted that when the lever has attained its extreme position so that contact 52—53 is closed, the swell 56ᵃ of cam 56 no longer engages the finger 58, but this finger is now held in its depressed position by the latch 59. If, now, the winding 51 is energized, the armature 62 is attracted and the trigger 63 engages the latch 59 to release the finger 58. Due to the resiliency of finger 58, the finger tends to return to the position in which it is shown in the drawings, and the cam 56 in the position in which it now occupies will permit this movement, but the finger is now held in its depressed position by engagement of the tip 64 on armature 62 with the tip of finger 58. The finger therefore remains in engagement with contact 61 until the winding 51 is de-energized, whereupon the armature 62 is restored to the position in which it is shown in the drawings by spring 70, and the finger 58 is then released and returns to the position illustrated in Fig. 5. The operation of the switching device E upon a movement back to the middle position, or from the middle position to a position in which contact 52—55 is closed or from this latter position back to its middle position, is similar to that just described and it will therefore be apparent that any movement of the lever 49 operates finger 58 which thereupon becomes latched, and can be released only if winding 51 is energized and subsequently de-energized.

If the switching device E has been operated so that the contact 58—61 is closed, and if the winding 51 is energized so that the contact 64—58 is also closed, it might happen that a quick movement of the lever 49 could be made without releasing the finger 58. This operation is undesirable, and to prevent its occurrence, I have provided the projections 57 on the arm 56. With this arrangement it will be seen that upon any movement of the lever one of the projections 57 engages the latch 59 and moves it to the right as shown in Fig. 5. If winding 51 is energized, this movement of the latch engages the trigger 63 and positively moves the tip 64 carried by the armature 62 out of engagement with the tip of finger 58. When this happens the finger 58 immediately returns to a position in which it engages the contact 60. It will be seen therefore that any movement of the lever ensures that the winding 51 will be de-energized. It will be apparent as the description proceeds that this operation of the switching device prevents the simultaneous delivery of two or more codes and therefore makes it impossible for confusion to exist between different codes.

Figure 1B:
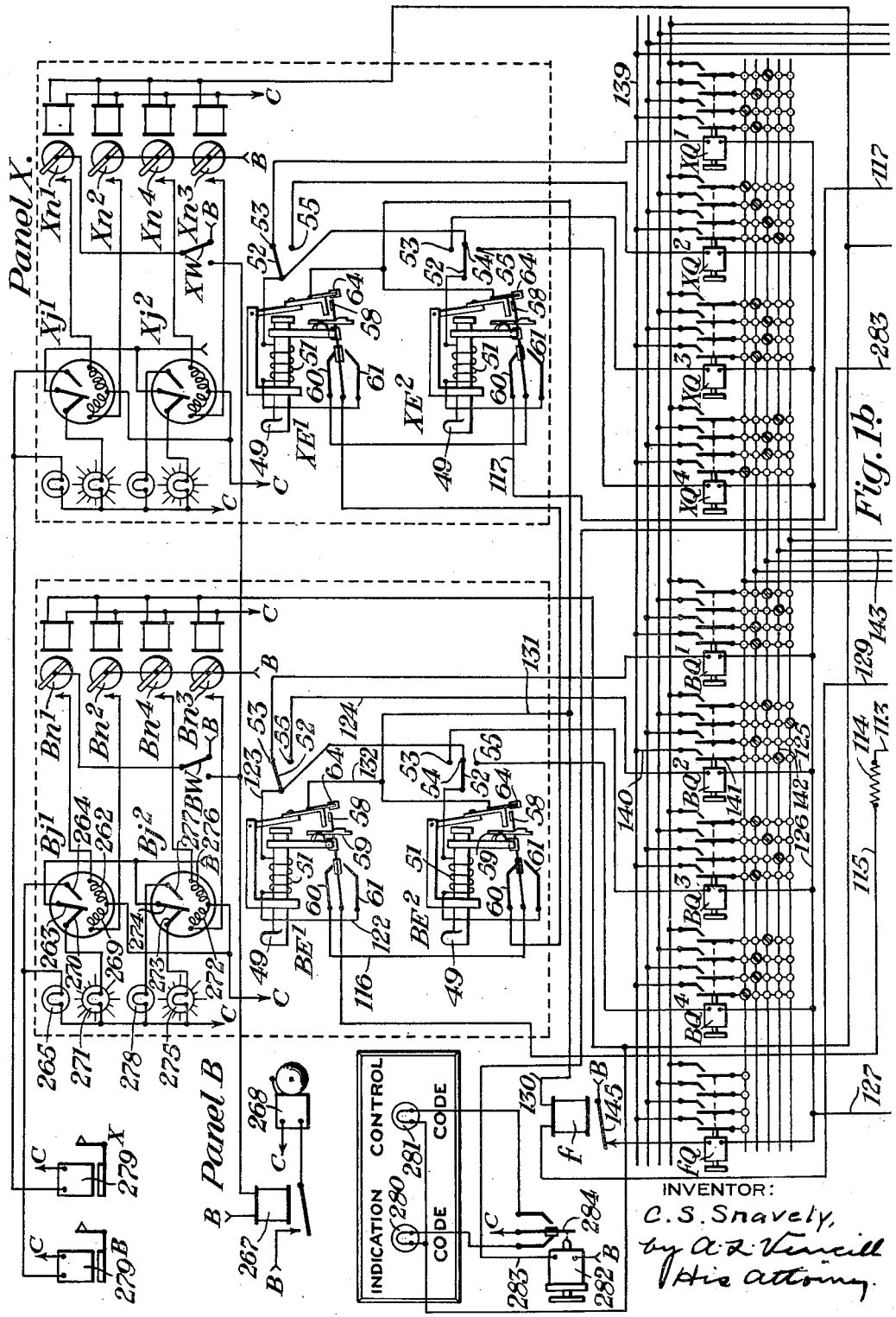

Referring now also to Fig. 1b, each panel is provided with a switching device $E^2$ similar to the device illustrated in Figs. 5 and 6. The panels are also each provided with a switching device $E^1$ similar in all respects to the switching device $E^2$ except that the switching devices $E^1$ are device $E^2$ except that the switching device $E^1$ are capable of assuming only two positions, contact 54 being omitted and the cam 56 being shaped to accomplish the operation of the associated contact finger 58 during movement from one extreme position or the other.

In Fig. 7, I have illustrated the cams 56 of an associated pair of switching devices $E^1$ and $E^2$. As will appear hereinafter each switching device $E^1$ controls a railway switch, and each switching device $E^2$ controls the signals governing traffic over this switch. The apparatus is so arranged that when the switching device $E^2$ occupies its middle position (in which contact 52—54 is closed) the signals controlled thereby indicate stop and it is desirable to prevent operation of the associated switch controlling switching device $E^1$ except when the signal controlling switching device $E^2$ occupies such middle position. In order to accomplish this result, the shaft 48 of each switching device is provided with a cam 66, and each panel is provided with a locking slide 68 connecting the two switching devices of the panel to prevent undesirable movements of the switching device $E^1$ as best shown in Fig. 7. The cam 66 of the device $E^2$ is provided with a notch 66ª to receive a stud 69 on the slide 68 when the switching device occupies its middle position. When the stud 69 of the locking slide 68 enters the notch 66ª, a second stud 69ª is moved out of the path of a projection 66ᵇ on the cam 66 of the associated switch controlling switching device $E^1$ so that under these conditions the device $E^1$ can be operated. If, however, the device $E^2$ is moved to either extreme position, the stud 69 is forced out of notch 66ª, thereby lifting the locking slide 68 to a position in which the stud 69ª prevents movement of the device $E^1$. The switching devices $E^1$ and $E^2$ of each panel are provided with locking apparatus similar to that shown in Fig. 7, and it is therefore impossible to operate any device $E^1$ unless the associated device $E^2$ occupies its middle position. Each of the cams 66 is provided with notches which co-operate with a spring 67 to accurately hold the associated shaft 48 in the positions in which the arm 52 engages one of the corresponding contacts.

The control station is also provided with a locking relay L, a motor relay $M^A$, and a delay relay $K^A$, which for convenience of manufacture, may be constructed similar to the delivery magnets $d$ of the coding units $g$. The control station also comprises a line relay $R^A$, a transmitting relay $T^A$, and a sectionalizing relay $S^A$. Certain of the relays just mentioned are utilized in the operation of checking and locking the line circuit preparatory to delivering a code to the circuit, and before describing the operation of the apparatus located at the control station, I will explain the operation of the checking and locking apparatus.

In Fig. 4, I have illustrated those portions of the apparatus which are involved in the checking and locking functions. It should be noted that the apparatus at station B includes a motor relay $M^B$ and a delay relay $K^B$ similar to those described in connection with the control stations and the operation of which will be explained hereinafter. For present purposes it is sufficient to state that when the sectionalizing relay $S^A$ is de-energized and when the motor relay $M^A$ is energized at the control station, the coding apparatus $A^A$ is set into operation to deliver a control code to the line circuit. In similar manner when the motor relay M and the associated sectionalizing relay S at any of the remote stations are both energized, the corresponding coding apparatus is actuated to deliver a code to the line circuit from such station. Each remote station is provided with a transmitting relay T, a sectionalizing relay S, and a line relay R, similar to the corresponding parts at the control station. As shown in Fig. 4, the line circuit which is normally closed through line wires 1 and 2, includes the winding of the line relay, a back contact 71 of the transmitting relay T, and a back contact 72—73 of the sectionalizing relay S at each station. This line circuit may be traced from battery $3^A$ at station A, through winding of line relay $R^A$, back contact 71 of relay $T^A$, back contact 72—73 of relay $S^A$, line wire 1 between stations A and B, winding of relay $R^B$, battery $3^B$, back contact 72—73 of relay $S^B$, thence through apparatus at succeeding stations similar to that at station B, thence through winding of relay $R^X$, battery $3^X$, back contact of relay $S^X$, and line wire 2 back to battery $3^A$. It will be noted that this line circuit includes a line battery, designated by the reference character 3 with a distinguishing exponent, at each station. This particular arrangement is not essential, and the entire line circuit could be supplied with energy from a single battery, as disclosed and claimed in a copending application Serial No. 254,690, filed Feb. 16, 1928, by Lloyd V. Lewis, for Railway traffic controlling apparatus, but by distributing the batteries throughout the system, thereby placing at each station a battery having sufficient electromotive force to supply the potential drop through the associated line relay and that portion of the line circuit between the corresponding station and the next station, the potential drop between the line wires at any point is kept at a minimum and it is unnecessary to introduce resistance units at the different stations to compensate for variations in the lengths of line wires between adjacent stations.

Since the line circuit is normally closed, all line relays R are normally energized. The sectionalizing relays S and transmitting relays T are all normally de-energized. Motor relays M and delay relays K are all normally de-energized, and the locking relay L at the control station is normally energized by virtue of a circuit which I will describe hereinafter.

At the control station the sending of a code is initiated by de-energizing the normally energized locking relay L. When this happens, a circuit is completed from terminal B, over front contact 75 of relay $R^A$, wires 76 and 77, winding of sectionalizing relay $S^A$, wire 78, back contact 79 of relay $K^A$, wire 80, and back contact 81 of relay L to terminal C. When this circuit is closed, relay $S^A$ picks up, and the relay is subsequently held in its energized condition over a circuit which passes from terminal B, over front contact 82—83 of sectionalizing relay $S^A$, wires 84 and 77, winding of relay $S^A$, wire 78, back contact 79 of relay $K^A$, wire 80, and back contact 81 of relay L to terminal C. When relay $S^A$ is energized, the normal line circuit through back contact 72—73 of this relay is opened, and a branch is closed from back contact 71 of relay $T^A$, through front contact 72—74 of relay $S^A$ to line wire 2. By virtue of this branch, a closed circuit is provided for relay $R^A$ and battery $3^A$ so that relay $R^A$ remains energized. Another result of the energization of relay $S^A$ is the closing of a pick-up circuit for the motor relay $M^A$, this circuit passing from terminal B, over front contact 85 of relay $S^A$, wires 86 and 87, winding of relay $M^A$, wire 80, and back contact 81 of relay L to terminal C. Relay $M^A$ therefore picks up, and is subsequently stuck up over its own front contact 88 and back contact 81 of starting relay L, the stick circuit being apparent from the drawings without tracing it in detail.

When relay $M^A$ becomes energized, a circuit is closed for transmitting relay $T^A$ which passes from terminal B, through the winding of relay $T^A$, thence through the code wheel contacts of the coding apparatus in series and front contact 89 of relay $M^A$ to terminal C. The code wheel contacts are all normally closed so that the circuit just traced is closed and relay $T^A$ picks up. It will be noted that the opening of back contact 71 of relay $T^A$ interrupts the circuit for relay $R^A$ so that the latter relay becomes de-energized. When this happens, the delay relay $K^A$ is energized over back contact 75 of relay $R^A$, thereby interrupting the circuit for relay $S^A$ at back contact 79 of relay $K^A$. The sectionalizing relay therefore becomes de-energized, but a snubbing circuit for this relay is now closed from terminal B, through resistance 90, front contact 79 of relay $K^A$, wire 78, winding of relay $S^A$, wires 77 and 84, front contact 82—83 of relay $S^A$ to terminal B. As a result of this snubbing circuit a considerable interval of time elapses before the sectionalizing relay releases, and during this interval of time it is impossible for the coding apparatus $A^A$ to be operated to deliver a control code to the line circuit. At the conclusion of the holding time of relay S, the relay closes its back contact 85, and when this occurs, since relay $M^A$ is now energized, current flows over the partial circuit including back contact 85 of relay $S^A$ and front contact 91 of relay $M^A$ to the motor of the coding apparatus $A^A$ as will be described hereinafter. The coding apparatus is thereupon set into operation to operate selected ones of the code wheel contacts. Each time a code wheel contact operates, the transmitting relay $T^A$ is de-energized, and when this occurs the line circuit is closed to all of the remote stations so that the operation of the coding apparatus $A^A$ under the conditions specified delivers the control codes to all of the remote stations.

It will be evident, therefore, that each control code transmitted is characterized by a relatively long initial line open impulse which begins when relay $T^A$ is first energized and which ends when relay $T^A$ is released by the operation of a code wheel.

At the conclusion of the code or codes originating at the control station, the locking relay L again becomes energized, thereby breaking the stick circuit for motor relay $M^A$, and allowing this relay to become deenergized, thereby stopping the operation of the motor of coding apparatus $A^A$. Since the line circuit is now completed through the winding of relay $R^A$, this relay is continuously energized and relay $K^A$ becomes deenergized to restore the apparatus to the condition in which it is shown in the drawings. It will be noted that when relay L becomes de-energized to commence the delivery of a code from the control station, relay $S^A$ can be energized only if relay $R^A$ is energized and relay $K^A$ is de-energized. If, however, the line circuit is receiving a code from another station, relay $R^A$ will follow this code and will hold relay $K^A$ in its energized position so that if relay L becomes de-energized while the code is being supplied to the line circuit, relay $S^A$ can not be energized so that the indication is stored until the line circuit is clear.

The delivery of a code from a remote station is initiated by the closing of any one or more of the storing magnet contacts, four of which are shown diagrammatically at each remote station on Fig. 4. The operation of these contacts will be explained below in connection with description of the coding apparatus at the remote stations. In explaining the delivery of a code from station B, I will first assume that the line circuit is closed as when no code is being supplied to this circuit, and that a storing magnet contact at station B becomes closed. Since relay $R^B$ is energized, current flows from terminal B, over front contact 75 of relay $R^B$, wire 92, back contact 93 of relay $K^B$, wires 94 and 95, winding of relay $S^B$, wire 96, and a storing magnet contact to terminal C. The sectionalizing relay $S^B$ therefore becomes energized and this operation shifts the line circuit at station B from back contact 72—73 of relay $S^B$, to front contact 72—74 of this relay, thereby including back contact 71 of transmitting relay $T^B$ in the line circuit to the control station, and interrupting the line circuit to all more remote stations. With relay $S^B$ energized, it will be apparent that the line wire 1 to all stations more remote is disconnected from the apparatus so that it is impossible for codes originating at such more remote stations to interfere with the delivery of codes from station B to the control station. Another result of the energization of the sectionalizing relay $S^B$ is the energization of the transmitting relay $T^B$, the circuit for this relay passing from terminal B, over front contact 75 of relay $R^B$, wire 92, back contact 93 of relay $K^B$, wires 97 and 98, thence through the code wheel contacts of the coding apparatus $A^B$ which will be described hereinafter, wire 99, winding of relay $T^B$, wire 100, and front contact 82—83 of relay $S^B$ to terminal C. When relay $T^B$ becomes energized the line circuit to the control station and including the relay $R^B$ is interrupted at back contact 71 of relay $T^B$, and relay $R^B$ then becomes de-energized, opening the pickup circuits for relays $S^B$ and $T^B$, but relay $S^B$ is held energized over a holding circuit which extends from terminal B, front contact 85 of relay $S^B$, back contact $93^a$ of relay $K^B$, relay $S^B$ and thence over wire 96 and a storing magnet contact to terminal C, while relay T^B is held energized over a circuit extending from terminal B, contacts 85 and 93^a, wires 94, 97, 98, the code wheel contacts, wire 99, relay T^B, wire 100 and contacts 82—83 of relay S^B. When relay R^B closes its back contact 75, current is supplied to relay K^B over a circuit which will be apparent from the drawings, and relay K^B therefore becomes energized. The opening of back contact 93^a of relay K^B interrupts the circuits for relays S^B and T^B but a snubbing circuit is now closed through relays S^B and T^B in series which may be traced from terminal C, through the storing magnet contact which is now closed, wire 96, winding of relay S^B, wires 95, 94, 97 and 98, code wheel contacts of coding apparatus A^B in series, wire 99, winding of relay T^B, wire 100, and front contact 82—83 of relay S^B to terminal C. The parts are so constructed that the voltage of self-induction of relay S^B is greater than that of relay T^B, and it follows that current will continue to flow for a time in the same direction in relay S^B, but will reverse in relay T^B, therefore relay T^B holds for only a brief interval when the snubbing circuit just traced is closed, but relay S^B requires a considerable interval of time to close its back contacts. When relay T^B releases, the closing of contact 71 connects relay R^B to the portion of the line circuit extending from station B toward the control station A. Although the line circuit was energized when the operations being described were initiated, it may happen that station A or an intermediate station between stations A and B will start the delivery of a code at the same time as station B, in which case the line circuit at station B will remain open after relay T^B closes its back contact for a time interval which is greater than the release period of relay S^B, so that relay R^B will remain deenergized until after relay S^B releases. Then when relay R^B picks up the pickup circuit for relay S^B will be open at back contact 93 of relay K^B and relay S^B will remain deenergized and the transmitter at station B will remain inactive until relay R^B becomes steadily energized and relay K^B releases at the end of the code delivered by the other station. It is apparent, therefore, that station B can continue to transmit only if it succeeds in delivering a relatively short interruption to which relay R^B responds, to the portion of the line circuit extending to station A. If this condition is fulfilled and relay R^B picks up before relay S^B releases, a circuit is completed over front contact 75 of relay R^B, wire 92, front contact 93 of relay K^B, wire 101, winding of relay M^B, wire 102, and front contact 103 of relay S^B to terminal C. The motor relay M^B therefore becomes energized and is subsequently stuck up over a circuit including its own front contact 104, and front contact 103 of relay S^B. The energization of the motor relay M^B sets the coding apparatus A^B into operation, and also completes the holding circuits for relays T^B and S^B. The holding circuit for relay T^B may be traced from terminal B, through front contact 105 of relay M^B, wire 98, code wheel contacts of coding apparatus A^B in series, wire 99, winding of relay T^B, wire 100 and front contact 82—83 of relay S^B to terminal C. The holding circuit for relay S^B may be traced from terminal B, over front contact 105 of relay M^B, wires 97, 94 and 95, winding of relay S^B, and wire 96 through a storing magnet contact to terminal C. As hereinafter explained in detail, the circuit for motor m is closed at contact 242 when relay M^B becomes energized, and when the motor commences to operate, contact 12 of the governor h closes to energize an auxiliary relay H^B. When relay H^B becomes energized, the code setting relay or delivery magnet corresponding to the operated storing magnet is energized to release the associated code wheel. The coding apparatus A^B then operates, with relays M^B, K^B and S^B energized, to deliver a code to the line circuit by periodically interrupting the circuit for relay T^B at a code wheel contact of the coding apparatus. At the conclusion of the code or codes which are stored at station B, all storing magnet contacts become opened and the circuit for relay S^B is then interrupted, so that this relay becomes de-energized to restore the normal line circuit. Relays T^B and M^B are then de-energized and the line relay R^B becomes steadily energized, if the line circuit is clear, to allow the relay K^B to release.

The checking and locking operations at each remote station are similar to those just described in connection with station B and it will be plain that no remote station can take command of the line circuit to deliver an indication code unless the line circuit is clear all the way to the control station. When any remote station is delivering a code to the line circuit, the line circuit to all stations more remote is interrupted, and each intermediate station between the sending station and the control station is locked out by the energization of relay K at such station. If the control station is delivering a code to the line circuit, the intermittent operation of the line relays R at the several stations hold the associated relays K in either energized positions, so that the transmitters at all remote stations are locked out and are prevented from delivering indication codes to the line circuit. Should two remote stations attempt to deliver codes to the line circuit at the same time, it is apparent that the station closer to the control station, by the operation of its sectionalizing relay S, would lock out the more remote station until the closer station has completed delivery of its codes. Finally, if the control station and a remote station attempt to gain control of the line circuit at the same time, the operation of the apparatus at the control station in initially opening the line circuit for a relatively long time interval measured by the release time of relay S^A, locks out the remote station which is attempting to transmit and prevents the delivery of any code to the line circuit from such remote station until the completion of the code from the control station.

In other words, each indication code transmitted to the control station is initiated by a locking element of a particular character, comprising a relatively short line open impulse, and the motor relay M at the remote station is energized to effect transmission of the indication code only if the characteristic initial impulse is properly delivered to the line circuit. Each control code is initiated by a locking element of a different character comprising a relatively long line open impulse which if initiated at the same time prevents the delivery of the locking impulse characteristic of an indication code. Furthermore, each remote station when transmitting delivers a single code element to the more remote stations which is similar to the initial element of a control code. It follows that the control station takes precedence over any remote station and each remote station takes precedence over the more remote stations.

I will now return to a description of the operation of the apparatus at the control station shown on Figs. 1ᵃ and 1ᵇ. Locking relay L is controlled in part by a master relay J comprising two windings 106 and 107 so arranged that when winding 107 is energized, contact 108—109 is closed, but when winding 106 is energized, contact 108—110 is closed. The relay is constructed in such manner that the contacts of the relay remain in the positions to which they were last moved. The locking relay L is also controlled by the switching devices E of all panels at the control station. Under normal conditions contact 58—60 of each switching device is closed, and current flows from terminal B, over back contact 111 of the delivery magnet d of coding unit g⁰, wire 112, contact 108—110 of master relay J, wire 113, resistance 114, wire 115, contact 58—60 of switching device BE¹, wire 116, contact 58—60 of switching device BE² and thence through contacts 58—60 of all switching devices E of all the control panels at the control station and wire 117, and winding of relay L to terminal C. Relay L is therefore normally energized, but it will be plain that the operation of any of the switching devices E will interrupt the circuit for relay L.

In describing the operation of the apparatus at the control station in delivering a control code to the line circuit, I will first assume that the operator reverses the switching device BE¹. This operation of the device closes contact 52—55 and also moves finger 58 into engagement with contact 61 in which position the finger 58 is held by latch 59. It will be plain that this operation of the switching device interrupts the circuit just traced for the locking relay L, so that this relay closes its back contact 81 and initiates the checking and locking operation previously described. After the cycle of operation described in connection with Fig. 4 has been completed, relay Sᴬ becomes deenergized, and since relay Mᴬ is then energized, an operating circuit for motor m is closed from terminal B, over back contact 85 of relay Sᴬ, wire 118, front contact 91 of relay Mᴬ, wire 119, armature 4 of motor m, and wire 120 to terminal C. A branch is provided for the circuit just traced from wire 119 through field 5 of motor m, wire 121, and a resistance 13 to terminal C. When the circuit just traced is closed, the motor m is set into operation and the speed of this motor is maintained at a constant value by means of a regulator h of the centrifugal type having a contact 11 shunted across the resistance 13 to decrease the resistance in series with the shunted field 5 when the speed of the motor exceeds a predetermined value. The governor h also controls a contact 12 which is closed at all times when the motor is operating, but which is opened when the motor is at rest.

As soon as the motor m commences to operate, the contact 12 closes and a circuit is then completed for a selected one of the code selecting relays Q, depending upon the position of the switching device which has been operated. I have assumed that contact 52—55 of device BE¹ is closed, and the code selecting relay BQ² is therefore energized over a circuit which may be traced from terminal B, through back contact 111 of unit g⁰, wire 112, contact 108—110 of master relay J, wire 113, resistance 114, wire 115, contact 58—61 of switching device BE¹, wire 122, winding 51 of switching device BE¹, wire 123, contact 52—55 of switching device BE¹, wire 124, winding of code selecting relay BQ², wires 125, 126 and 127, contact 12 operated by governor h of motor m, and wire 128 to terminal C. As explained hereinbefore, the energization of a code selecting relay Q connects certain ones of the fixed segments of the stepping contactor P with selected ones of the delivery magnets of the coding units g to provide a distinctive code as shown in the drawings. The code which is delivered to the line circuits when the switching device BE¹ is moved to its reverse position, as just described, is made up of six digits having the following impulses, 6—4—2—5—3—1 as will presently appear. It should also be noted that the circuit, by means of which the code selecting relay BQ² is energized, includes the winding 51 of the switching device BE¹, so that the armature of this switching device is now attracted and the latch 59 is released, but the tip 64 on armature 62 now engages the end of finger 58, and prevents the movement of this finger to its original position until the winding 51 is again de-energized.

Furthermore, since contact 64—58 of switching device BE¹ is now closed, an auxiliary circuit is closed from terminal B, over back contact 111 of coding unit g⁰, wire 112, winding 107 of master relay J, wire 129, winding of reset relay f, wires 130, 131 and 132, contact 64—58 of switching device BE¹, contact 58—61 of switch device BE¹, wire 122, winding 51, wire 123, contact 52—55, and thence as before through the winding of relay BQ² and contact 12 of governor h to terminal C. The current delivered to winding 107 of master relay J over this circuit, reverses the relay and closes contact 108—109. Current then flows from terminal B, over back contact 111 of coding unit g⁰, wire 112, contact 108—109 of master relay J, wire 134, winding of the operating magnet F of the stepping contactor P, wire 135, and thence through back contacts of the delivery magnets d of all of the coding units g in series except coding unit g⁰. Since the delivery magnets are all normally de-energized, magnet F now becomes energized. This operation of magnet F moves the pawl 41 (Fig. 8) one tooth on the ratchet wheel 31, but does not shift the spider 29 which normally engages the fixed segment 39. When the magnet F becomes energized, however, its front contact 136 becomes closed, and a circuit is then completed for the delivery magnet of the coding unit g⁶ from terminal B, over front contact 136 of magnet F, wire 137, contact 29—39 of stepping contactor P, and thence through the winding of the delivery magnet d of coding unit g⁶ to terminal C. Since the motor m is now operating, the energization of the delivery magnet of the coding unit g⁶ to withdraw the latch from the cam 15, allows the code wheel D⁶ to rotate, thereby actuating the contact 14 associated therewith to open this contact six times. It will be remembered that the contact 14 of the code wheel D⁶ is included in the circuit over which relay Tᴬ is energized so that each time the contact 14 of code wheel D⁶ is opened, relay Tᴬ becames de-energized to deliver an impulse to the line circuit. When the six impulses comprising the first digit have been delivered to the line circuit by coding unit g⁶, the latch 18 again enters a notch in the cam 15 and prevents further operation of the code wheel. When the delivery magnet became energized to initiate the delivery of the first digit of the code to the line circuit, the back contact 19 of this delivery magnet opened, thereby opening the circuit previously traced for the operating magnet F, and this magnet therefore became de-energized. As a result, the spider 29 of the stepping contactor P was advanced one step, thereby breaking contact 29—39 and closing contact 29—38. The circuit for the delivery magnet was opened when relay F became de-energized, and the circuit is now held open by the stepping contactor but the coding unit continued to operate because the latch was mechanically held by engagement with the periphery of the cam 15.

As soon as the delivery of the first digit of the code by unit $g^6$ is completed, the contact 19 of this unit again closes, thereby completing the circuit for magnet F. The contact 136 of this magnet is therefore closed, but the spider 29 is not moved, and current is supplied now to a selected one of the coding units depending upon which of these units is connected with segment 38 of the stepping contactor P. This selection is, of course, controlled by the code selecting relay $BQ^2$ and under the present conditions, this circuit may be traced from terminal B, over front contact 136 of magnet F, wire 137, contact 29—38 of contactor P, wire 138 to bus bar 139 and thence over wire 140, front contact 141 of relay $BQ^2$, bus bar 142 and wire 143, through the delivery magnet $d$ of unit $g^4$ to terminal C. The unit $g^4$ is therefore set into operation to open its contact 19 and de-energize the magnet F of the stepping contactor P, thereby advancing this contactor one step. Since the motor $m$ is still operating the energization of the delivery magnet of unit $g^4$ starts the operation of code wheel $D^4$ and the contact 14 operated by this code wheel then interrupts the circuit for the relay $T^A$ four times to deliver the second digit of the code, in this case consisting of four impulses, to the line circuit. The remaining digits of the code are delivered to the line circuit in a manner similar to that described in connection with the first two digits of the code, it being noted that the third, fourth, and fifth digits of the code in this case consisting of two, five and three impulses, respectively, are produced by the corresponding ones of the coding units $g$, depending upon the bus bars which are connected together by the energization of the code selecting relay $BQ^2$.

At the conclusion of the fifth digit of the code, the spider 29 engages the segment 34 and the next digit of the code is a single impulse delivered by unit $g^1$. In the next position of the stepping contactor P, to which position the spider 29 is moved as soon as the code wheel $D^1$ starts the delivery of the sixth digit of the code, contact 29—33 is closed. When the contact 19 of the delivery magnet $d$ of coding unit $g^1$ closes after the conclusion of the sixth digit, the magnet F becomes energized, and current flows from terminal B, over front contact 136 of magnet F, wire 137, contact 29—33 of contactor P, and thence through the delivery magnet $d$ of coding unit $g^0$ to terminal C. The front contact of this coding unit is then closed and the back contact opens. The opening of the back contact of unit $g^0$ interrupts the circuit for winding 51 of switching device $BE^1$ and the armature of this device is therefore released to break contact 64—58 and permit the finger 58 to return to the position in which it is shown in the drawings. Relay $f$ also becomes de-energized. At the same time the code selecting relay $BQ^2$ is de-energized. If no other switching device has been operated, the circuit originally traced for the locking relay L is then completed and the relay becomes energized to de-energize relay $M^A$. Relay $K^A$ is also de-energized by the steady energization of the line relay $R^A$.

The closing of front contact 111 of coding unit $g^0$ completes a circuit from terminal B, over front contact 111, wire 144, and winding 106 of master relay J to terminal C. The master relay is then restored to normal so that contact 108—109 is opened. When the latch 18 of the coding unit $g^0$ enters the next notch in one cam 15, contact 111 is again closed and the circuit first traced for locking relay L through the contact 59—60 of the switching devices E is closed and if all switching devices now occupy their normal positions in which they are shown in the drawings, the locking relay L becomes energized and the apparatus is restored to normal in the manner previously described in connection with Fig. 4.

It should be noted that the opening of front contact 111 of the coding unit $g^0$ at the beginning of the operation of this unit de-energized magnet F, thereby stepping the spider 29 to a position in which contact 29—39 is closed so that the apparatus is now ready to commence the delivery of another code.

If other switching devices E at the control station have been operated during the delivery of the code initiated by switching device $BE^1$, the circuit for locking relay L will not be completed when the finger 58 of switching device $BE^1$ returns to its normal position. Instead, the cycle of operations previously described will be repeated with the exception that the code selecting relay corresponding to another switching device E will then be energized to deliver a corresponding code to the line circuit. If a switching device is operated while a code is being delivered from the control station, the code corresponding to the switching device will be delivered to the line circuit immediately upon the completion of the code then being delivered and the relays $R^A$, $T^A$, $S^A$, $M^A$, and $K^A$ do not operate to perform the usual checking functions. This checking of the line circuit is, of course unnecessary, because no remote station can take command of the line until the normal line circuit has been re-established after a completion of the code originating at the control station.

It will be observed that since the control circuit for the locking relay L which includes the contacts 58—60 of all of the switching devices E traverses these contacts in a definite order, the switching devices will take precedence in this order. That is to say, if devices $BE^1$ and $XE^1$ are both operated at the same time, the device $BE^1$ will deliver its code first, because the finger 58 of this device is connected with terminal B and when the finger is moved to its operated position, energy is disconnected from all subsequent devices in the series at the contact 58—60 of device $BE^1$. After the code corresponding to the device $BE^1$ has been completed, the next device in order, in this case, device $XE^1$, will deliver its code to the line circuit and so on, until all of the devices which have been operated, have delivered their proper codes to the line circuit.

If any switching device is operated to initiate the delivery of its code to the line circuit and is restored to its original position before the corresponding code is completed, the winding 51 of such device is immediately de-energized and the undelivered portion of the code is cancelled. It is necessary, however, for the stepping contactor P to have its contact 29—39 closed to commence the delivery of a code. To ensure that this contact always occupies its proper position when a code is not being delivered to a line circuit, I have provided a reset relay $f$ and a code selecting relay $fQ$ controlled thereby. I have already explained how relay $f$ is energized when a code is being delivered to the line circuit. Should a switching device be restored to its original position before the completion of the corresponding code, relay $f$ immediately becomes de-energized, and the closing of back contact 45 thereon, completes a circuit for the coding relay $fQ$, which then picks up to connect the bus bars associated with contacts 35, 36, 37 and 38 of the contactor P with the delivery magnet $d$ of the coding unit $g^1$. The apparatus thereupon operates to finish out the code with digits of one impulse each in order to ensure that the stepping contactor P comes to rest with contact 29—39 closed in order to be prepared for the delivery of another code.

The control codes delivered to the line circuit by the control station through the medium of the apparatus illustrated in Figs. 1ᵃ and 1ᵇ, operate the line relays R at all remote stations. As best shown in Fig. 4, each remote station is provided with a plurality of selectors which are selectively responsive to the control codes thus supplied to the line circuit. The selectors at the remote stations are each designated by the reference character N with a prefix corresponding to the station and a distinguishing exponent. Each time a line relay becomes de-energized an impulse of energy is supplied to each of the associated selectors over back contact 75 of the line relay. It follows, therefore, that the selectors at their station are supplied with impulses in accordance with the control codes delivered to the line circuit.

The selectors may be utilized to control traffic governing devices in any suitable manner. As shown in Fig. 3, selectors $BN^1$, $BN^2$, $BN^3$ and $BN^4$ at station B control traffic governing devices associated with a section of railway track $a$—$b$. This section is provided with a switch $e$ connected with a siding $u$. The switch $e$ is operated by a motor $z$ comprising an armature 167 and a field 168 and controlled by two relays $p^1$ and $p^2$. Eastbound traffic over the switch $e$ is controlled by two signals $w^1$ and $w^2$ located adjacent point $a$ and westbound traffic by two similar signals $w^3$ and $w^4$ located adjacent point $b$. The section $a$—$b$ is also provided with a track circuit comprising a battery 232 connected across the rails adjacent one end of the section, and a track relay $v$ connected across the rails adjacent the other end of the section. Associated with the track relay $v$ is a slow-acting repeater relay $y$ having a circuit including a front contact 215 of the track relay $v$. The signals $w^1$, $w^2$, $w^3$ and $w^4$ are controlled in part by two relays $q^1$ and $q^2$ which are in turn controlled by two of the selectors $BN^3$ and $BN^4$.

As shown in the drawings the section of track $a$—$b$ is unoccupied. The switch $e$ occupies its normal position, all signals $w$ indicate stop, and all of the relays $p^1$, $p^2$, $q^1$ and $q^2$ are de-energized. Relays $v$ and $y$ are both energized.

If the operator at the control station wishes to reverse the switch $e$ at station B, he reverses the switching device $BE^1$ on panel B (Fig. 1ᵇ). As a result, there is delivered to the line circuit a distinctive control code and the parts are so arranged that this code closes the contact of selector $BN^2$ for a brief interval of time. While this contact is closed a circuit is established for relay $p^2$ (Fig. 3) which may be traced from terminal B, through wire 146, winding of trip relay $t$, wire 147, contact of selector $BN^2$, wires 148 and 149, and winding of relay $p^2$ to terminal C. Relay $p^2$ therefore becomes energized, and is subsequently held in its energized condition by a stick circuit which passes from terminal B, over contact 150—151 operated by switch $e$, wire 153, back contact 154 of relay $p^1$, wire 155, front contact 156 of relay $p^2$, wires 157 and 149, and winding of relay $p^2$ to terminal C. The contact of the selector $BN^2$ opens after a brief interval of time and the trip relay $t$ is then again de-energized, but relay $p^2$ is now held closed as long as contact 150—151 is closed. When relay $p^2$ is energized, the motor $z$ is operated to move the switch to its reverse position, the circuit for the motor passing from terminal B, over front contact 158 of track relay $v$, wires 159 and 160, front contact 161 of relay $p^2$, wire 161ᵃ, armature 167 of motor $z$, wires 162 and 163, front contact 164 of relay $p^2$, wires 165 and 166, and field 168 of motor $z$ to terminal C. When the switch has attained its full reverse position, contact 150—151 opens, thereby breaking the stick circuit for relay $p^2$, and allowing this relay to become de-energized.

If, now, the operator at the control station wishes to restore the switch $e$ at station B to its normal position, he restores the switching device $BE^1$ to its normal position, whereupon the coding apparatus at the control station, delivers to the line circuit a different code from that which is delivered when the switching device $BE^1$ is reversed and this causes the operation of selector $BN^1$ to close its contact for a brief interval of time. The operation of selector $BN^1$ completes a circuit from terminal B through wire 146, winding of trip relay $t$, wire 147, contact of selector $BN^1$, wires 169 and 170, and winding of relay $p^1$ to terminal C. The contact of selector $BN^1$ opens after a brief interval to de-energize relay $t$, but relay $p^1$ remains energized, its stick circuit now being closed from terminal B, over contact 150—152 operated by switch $e$, wire 171, back contact 172 of relay $p^2$, wire 173, front contact 174 of relay $p^1$, wires 175 and 170, and winding of relay $p^1$ to terminal C. When relay $p^1$ is energized, current is supplied to motor $z$ to drive the switch $e$ to its normal position. The operating circuit for the motor under these conditions is from terminal B, through front contact 158 of track relay $v$, wires 159 and 176, front contact 177 of relay $p$, wires 178 and 162, armature 167 of motor $z$, wires 161ᵃ and 179, front contact 180 of relay $p^1$, wires 181 and 166, and field 168 of motor $z$ to terminal C. When the switch has been restored to its full normal position contact 150—152 opens, thereby de-energizing relay $p^1$.

If the operator at station A wishes to clear the signals governing the switch $e$, he may do so by proper manipulation of the switching device $BE^2$. For example, I will assume that the switch $e$ occupies its normal position, as shown in the drawings, and that the operator moves the device $BE^2$ to one extreme position, for example, to close contact 52—53 of the switching device. The code then delivered to the line circuit operates the selector $BN^3$ at station B, and current flows from terminal B, through the contact of selector $BN^3$, wires 182 and 183, and winding of relay $q^1$ to terminal C. Relay $q^1$ is held in its energized position after the opening of the contact of selector $BN^3$ by a stick circuit which passes from terminal B, through wire 184, back contact 185 of trip relay $t$, wire 186, back contact 188 of relay $q^2$, wire 189, front contact 190 of relay $q^1$, wires 191 and 183, and winding of relay $q^1$ to terminal C. When relay $q^1$ is energized, signal $w^2$ is moved to its proceed position, the operating circuit for this signal passing from terminal B, through front contact 192 of relay v, wires 193 and 194, front contact 195 of relay $q^1$, wire 196, contact 197—198 operated by switch e, wire 200, and the operating mechanism of signal $w^2$ to terminal C. If the switch e occupies its reverse position when relay $q^1$ is energized, a branch is completed for the circuit just traced from wire 196, over contact 197—199 operated by switch e, wire 201, and operating mechanism of signal $w^1$ to terminal C. It will be manifest, from the foregoing that if relay $q^1$ is energized, signal $w^2$ or signal $w^1$ indicates proceed, according as switch e occupies its normal or its reverse position.

If the switching device $BE^2$ on panel B at station A is operated away from its middle position to close contact 52—55, the control code then supplied to the line circuit operates selector $BN^4$ at station B and current flows from terminal B, through the contact of selector $BN^4$, wires 202 and 203, and the winding of relay $q^2$ to terminal C. After the contact of selector $BN^4$ opens, a stick circuit holds relay $q^2$ in its energized condition, current flowing from terminal B, through wire 184, back contact 185 of trip relay t, wires 186 and 187, back contact 204 of relay $q^1$, wire 205, front contact 206 of relay $q^2$, wires 207 and 203, and winding of relay $q^2$ to terminal C. When relay $q^2$ is energized, signal $w^4$ is operated provided the switch e occupies its normal position, current flowing from terminal B, through front contact 192 of relay v, wire 193, front contact 208 of relay $q^2$, wire 209, contact 210—211 operated by switch e, wire 213, and operating mechanism of signal $w^4$ to terminal C. If switch e occupies its reverse position when relay $q^2$ is energized, a branch is closed for the circuit just traced from wire 209, through contact 210—212 operated by switch e, wire 214, operating mechanism of signal $w^3$ to terminal C. When relay $q^2$ is energized, therefore, signal $w^4$ or signal $w^3$ indicates proceed according as switch e occupies its normal or its reverse position.

It will be observed that back contact 185 of the trip relay t is included in the stick circuits for both relays $q^1$ and $q^2$, so that any energization of this trip relay will break the stick circuit for either of these relays which happens to be energized, and will therefore restore all of the signals w to stop. But the trip relay t is energized when either of the selectors $BN^1$ or $BN^2$ is operated. These two selectors control the switch operating motor z and are responsive to the codes delivered from the switching device $BE^1$ at the control station. The purpose of this construction is as follows:

Referring again to Figs. 1ª and 1ᵇ, it will be noted that the middle contact 54 of each switching device $E^2$ is connected directly with the movable contact arm 52 of the associated switching device $E^1$. With this arrangement it will be plain that if switching device $BE^2$ is moved from either extreme position to the middle position, the coding apparatus $A^A$ will operate to deliver to the line circuit, the code corresponding to the position which the switch controlling switching device $E^1$ then occupies. That is to say, as shown in Fig. 1ᵇ, the switching device $BE^1$ occupies its normal position so that contact 52—53 is closed. If, now, the switching device $BE^2$ is operated to one extreme position to close contact 52—55, the selector $BN^3$ at station B will be operated to pick up relay $q^1$ as explained hereinbefore. Since the switch e occupies its normal position, signal $w^2$ will then be moved to its proceed position. If, now, the switching device $BE^2$ is restored to its middle position so that contact 52—54 is closed, the coding apparatus is set into operation at the control station to deliver to the line circuit the same code which would be delivered were the switching device $BE^1$ moved from its reverse to its normal position, and during the delivery of this code, the code selecting relay $BQ^1$ would be energized so as to operate the selector $BN^1$ at station 1. The operation of this selector, would, of course pick up relay $p^1$. Since switch e occupies its normal position, the stick circuit for this relay is open at contact 150—152 operated by the switch e, and the relay $p^1$ again becomes de-energized without affecting the switch in any way, as soon as the selector $BN^1$ opens its contact. During the brief interval that the selector $BN^1$ has its contact closed, however, the trip relay t is energized, thereby opening back contact 185 and interrupting the stick circuit for relay $q^1$. As a result the relay $q^1$ becomes de-energized and remains de-energized until selector $BN^3$ is again operated to close the pick-up circuit for this relay. One advantage of my invention is that this important operation of restoring signals to stop is accomplished without the necessity of a separate and distinct code for this purpose.

In order to inform the operator at the control station concerning the condition of apparatus at the several remote stations, each remote station is provided with apparatus for delivering to the line circuit indication codes for operating selectors at the control station in accordance with the condition of the apparatus at the remote stations. Referring particularly to Figs. 2 and 3, the station B is provided with coding apparatus $A^B$ similar to that described in the Snavely application Serial No. 254,684 referred to hereinbefore. This coding apparatus has some features in common with the coding apparatus located at the control station, and comprises a motor m driving a shaft 10 which operates a plurality of code wheels each designated by the reference character D with an appropriate distinguishing exponent.

Each of the code wheels D of the coding apparatus $A^B$ delivers a complete code, however, instead of simply delivering code elements as is the case with the apparatus located at the control station. Each of the code wheels in the apparatus $A^B$ is controlled by a code setting relay or delivery magnet d similar to the delivery magnet d at the control station, and associated with each such delivery magnet d is a storing magnet r having an armature which is normally biased to the right by spring contacts 235 and 234. When the storing magnet is energized, the armature is moved to its left-hand end or attracted position, thereby closing front contact 235 and opening back contact 234. When the parts are in these positions, a latch 236 drops into a position in which the armature is mechanically held in its attracted position. For the purpose of disengaging the latch 236, the latch 18 operated by delivery magnet d is provided with a tip which engages an inclined surface of the latch 236 in such manner that when the delivery magnet d is energized, the latch 18 lifts the latch 236 out of engagement with the armature of the storing magnet. It should be observed, however, that when the latch 18 is in the position corresponding to the energized condition of the delivery magnet d, the armature of the storing magnet r is held in its left-hand position by direct engagement of the latch 18 with the armature itself, so that the front contacts of the storing magnet are held closed, even though the latch 236 is released, and even though the storing magnet may be electrically de-energized. It should also be pointed out that after the latch 18 has once been operated to release the cam 15, and the motor has rotated the cam away from registration of the latch, the engagement of the latch with the edge of the cam will prevent the return of the latch to its normal position. After the cam has once been released to permit operation of the associated code wheel, the latch 18 is mechanically held in a position in which the front contacts of both the delivery magnet and storing magnet are closed, until the code wheel has made a complete revolution to permit the latch to enter another notch in the cam 15. During this operation of the code wheel, a complete code is relivered to the line circuit by periodically energizing relay $T^B$ in a manner previously described in connection with Fig. 4.

Each of the code wheels is controlled by a storing magnet and a delivery magnet and each code wheel with its associated magnets and contacts may be referred to collectively as a coding unit and for distinguishing these coding units from the coding units of the apparatus located at the control station, I have identified each of them by the reference character G with a suitable distinguishing exponent.

The storing magnets $r$ of the coding units G at each remote station may be controlled in accordance with the condition of the governing devices at that station in any suitable manner. As shown in Figs. 2 and 3, units $G^1$ and $G^2$ are controlled in accordance with the condition of the track circuit, and units $G^3$ and $G^4$ are controlled in accordance with the position of switch $e$ at station B. For example, if a train enters section $a$—$b$, relay $v$ becomes de-energized, thereby de-energizing relay $y$. Relay $y$ is slow-acting, however, and an interval of time elapses after relay $v$ is de-energized during which relay $y$ holds its front contacts closed. During this brief interval of time, an impulse of energy is delivered from terminal B on Fig. 3, through back contact 215 of relay $v$, wire 216, front contact 217 of relay $y$, and wire 218 to the coding apparatus $A^B$. As seen in Fig. 2, the continuation of this circuit in the coding apparatus passes from wire 218, through wire 237, the winding of the storing magnet $r$ of coding unit $G^1$, wires 238 and 239, back contact 240 of relay $H^B$, and wire 241 to terminal C. When the storing magnet $r$ of unit G is energized, it is latched in its attracted position by the latch 236 so that the storing magnet holds its front contacts closed after the energizing circuit just traced is interrupted.

When any one of the storing magnets of the coding apparatus $A^B$ is energized, a circuit is completed for the sectionalizing relay $S^B$, as previously explained in connection with Fig. 4. The operation of relay $S^B$ initiates the checking and locking functions of the relays $T^B$, $S^B$, $R^B$, $M^B$, and $K^B$ and if the line circuit is clear, relay $M^B$ becomes energized at the conclusion of the checking operation. When relay $M^B$ becomes energized, a circuit is closed for the motor $m$ from terminal B, through wire 243, front contact 242 of motor relay $M^B$, wires 244 and 244ª, armature 4 of motor $m$, and wires 245 and 246 to terminal C. This circuit is provided with a branch which passes from wire 244ª, through field 5 of motor $m$, wire 247 and resistance 13 to wire 246. The motor $m$ drives a governor $h$, a contact 11 of which is shunted across resistance 13 as explained in connection with coding apparatus $A^A$, to maintain constant the speed of the motor $m$. When the motor $m$ commences to operate, contact 12 is closed, and a circuit is then completed for an auxiliary relay $H^B$. This circuit may be traced from terminal B, through wire 243, front contact 242 of motor relay $M^B$, wires 248 and 253, and thence through back contacts 232—233 of all of the delivery magnets $d$ in series, wire 254, winding of relay $H^B$, wire 255, contact 12 of governor $h$, and wires 256 and 246 to terminal C. When relay $H^B$ becomes energized, the delivery magnet associated with the storing magnet which has its front contacts closed becomes energized. In the present instance, the delivery magnet $d$ of the coding unit $G^1$ becomes energized over a circuit which may be traced from terminal B, through wire 243, front contact 242 of motor relay $M^B$, wire 248, front contact 234 of storing magnet $r$ of coding unit $G^1$, wires 249 and 250, winding of delivery magnet $d$ of coding unit $G^1$, wires 251 and 252, front contact 240 of relay $H^B$, and wires 241, 241ª and 241ᵇ to terminal C. The delivery magnet $d$ therefore becomes energized and releases the latch 236 of the associated storing magnet $r$. Since the motor $m$ is now operating, the code wheel $D^1$ is therefore set into operation and the delivery magnet and the storing magnet of the coding unit $G^1$ are held in their energized positions until the conclusion of the code which is now delivered by the code wheel $D^1$. At the conclusion of this code, latch 18 again enters the notch in the cam 15, thereby preventing further operation of code wheel $D^1$ and closing the back contacts of the delivery magnet and the storing magnet of coding unit $G^1$. When this occurs the circuit for relay $H^B$ is again closed, this relay having become de-energized when the delivery magnet $d$ of coding unit $G^1$ first became energized. When relay $H^B$ picks up, if any storing contact in coding apparatus $A^B$ is closed, the corresponding delivery magnet is energized and another code wheel is operated to deliver the corresponding code to the line circuit. If, however, no other storing contacts in coding apparatus $A^B$ are closed, the relay $S^B$ becomes de-energized, thereby restoring the line circuit to normal and causing relays $M^B$, $K^B$, $H^B$ and $T^B$ to become de-energized.

As explained in detail in my previous application Serial No. 254,684, it is impossible for more than one code to be delivered to the line circuit at one time, and if more indications than one are received, these indications are stored by the mechanical latching of the storing magnets until the corresponding code is actually delivered to the line circuit. In the form of my apparatus here shown, the coding unit $G^2$ is arranged to be operated when the train leaves section $a$—$b$. The circuit for the storing magnet of this unit passing from terminal B on Fig. 3, through front contact 215 of relay $v$, wires 219 and 220, back contact 221 of relay $y$, and wire 222 to the coding apparatus $A^B$ and thence on Fig. 4, through wire 259, winding of storing magnet $r$ of coding unit $G^2$, wires 260 and 239, back contact 240 of relay $H^B$, and wire 241 to terminal C. This circuit is closed only for a brief interval during the time required by relay $y$ to become energized after relay $v$ has picked up following the departure of a train from section $a$—$b$.

In similar manner, the coding units $G^3$ and $G^4$ are controlled in accordance with the position of switch $e$. For example, I will assume that the switch e has been moved to its reverse position by energizing relay $p^2$, as described hereinafter. When the switch attains its full reverse position a circuit is completed from terminal B on Fig. 3, through contact 223—225, wire 226, front contact 227 of relay $p^2$, and wire 228 to the coding apparatus $A^B$, and from wire 228 on Fig. 4 to the storing magnet r of coding unit $G^4$ as will be plain from the drawings without tracing the circuit in detail. The storing magnet r of coding unit $G^3$ is energized when switch e of station B is restored to its normal position, the circuit for accomplishing this result, passing from terminal B on Fig. 3, through contact 223—224 operated by switch e, wire 229, front contact 230 of relay $p^1$, and wire 231 and thence through the storing magnet r of coding unit $G^3$, as will be apparent from an inspection of Fig. 2.

When more storing magnets than one are energized simultaneously the corresponding codes are delivered to the line circuit consecutively in the order determined by the circuits for the delivery magnets. After a storing magnet is energized, however, the latch 236 holds the armature of the magnet in its attracted position until the corresponding code has been sent out. As shown in the drawings, unit $G^1$ delivers its code before unit $G^2$. If therefore, a train enters section a—b at station B, and then leaves the section, the storing magnets of units $G^1$ and $G^2$ will both be energized. If the train again enters the section before the codes have been delivered, $G^1$ will deliver its code first, and $G^2$ will then deliver its code. The result will be that the code corresponding to an unoccupied track section is the last code sent out, although the section is now occupied. In order to prevent this condition, I provide a latch magnet 257 connected in parallel with the storing magnet r of unit $G^1$, and arranged when energized to lift the latch 236 of storing magnet r of unit $G^2$. With this arrangement it will be seen that if the storing magnet of unit $G^2$ is latched up, and if the storing magnet of unit $G^1$ then becomes energized, the energization of latch magnet 257 will trip the storing magnet of unit $G^2$. It follows that if unit $G^1$ is the last to have its storing magnet energized, this unit, but not unit $G^2$ will deliver its code to the line as soon as the line circuit is clear.

For similar reasons I have provided a latch magnet 258 for releasing the storing magnet of unit $G^4$ if the storing magnet of unit $G^3$ is energized. It is therefore assured that the code delivered to the line circuit at any time from a station represents the condition then occupied by the apparatus at the station at that time.

Located at the control station and associated with each of the panels are selectors which are selectively responsive to the codes delivered to the line circuit by the coding apparatus located at each remote station. Referring again to Figs. $1^a$ and $1^b$, it will be seen that the selectors $Bn^1$, $Bn^2$, etc., on panel B and selectors $Xn^1$, $Xn^2$, etc., on panel X are supplied in parallel with current over back contact 75 of relay $R^A$ when this relay becomes de-energized. It will be remembered that the relay $R^A$ follows the codes delivered to the line circuit by any remote station, and it follows that the selectors at the control stations are supplied with impulses of energy in accordance with the code delivered from the remote stations. The selectors on each panel control two indication relays each similar to the master relay J, and each designated by the reference character j with a prefix corresponding to the panel and a distinguishing exponent. Referring particularly to panel B, I will assume that the selector $Bn^1$ is operated by the code delivered by coding unit $G^1$ at station B. When a train enters section a—b at station B, therefore, the selector $Bn^1$ at the control station closes its contact for an instant, and when this occurs current is supplied to one winding of relay $Bj^1$ over a circuit which passes from terminal B, through a normal contact of a manually operable circuit controller BW, the contact of selector $Bn^1$, and winding 262 of relay $Bj^1$ to terminal C. The relay $Bj^1$ is then energized to close contact 263—264 and current is supplied to an indication lamp 265 over a circuit which will be apparent from the drawings. The contacts of the indication relays j remain in the positions to which they were last moved, so that this indication lamp 265 remains energized after the contact of the selector $Bn^1$ is opened, to indicate to the operator at the control station that section a—b at station B is occupied by a train.

It is sometimes desirable to give an audible indication as well as a visual indication of the entrance of a train into a section of track controlled from station A. In order to accomplish this result the circuit controller BW on panel B may be reversed, and the winding of a relay 267 is then inserted in the circuit controller by the contact of selector $Bn^1$ for reversing relay $Bj^1$. The relay 267 will therefore be energized for a brief interval of time when selector $Bn^1$ is operated. When relay 267 is energized, an audible signal, such for example, as a bell 268 is operated to inform the operator that a train has entered a track section. The relay 267 may be controlled by the selector of any panel by operating the appropriate circuit controller W.

The selector $Bn^2$ at panel B is arranged to respond to the code from unit $G^2$ at station B, and when this selector closes its contact current is supplied to winding 269 of relay $Bj^1$ over a circuit which will be apparent from the drawings. When this winding is energized, contact 263—270 is closed to light lamp 271, thereby informing the operator that section a—b at station B is now unoccupied. In similar manner, the selectors $Bn^3$ and $Bn^4$ are responsive to the codes delivered from coding units $G^3$ and $G^4$ at station B. When selector $Bn^3$ is operated winding 272 of relay $Bj^2$ is operated to close contact 273—274 of this relay and light lamp 275. It follows that when lamp 275 is lighted, the operator knows that the switch e at station B occupies its normal position. When selector $Bn^4$ is operated, however, winding 276 of relay $Bj^2$ is energized and contact 274—277 of this relay is then closed to energize lamp 278, thereby informing the operator that switch e at station B occupies its reverse position. Each of the remaining panels at the control station is provided with apparatus similar to that just described in connection with panel B, and the operation of the apparatus will be apparent from the foregoing description.

In addition to the visual and audible indication concerning the condition of apparatus at remote stations, it is sometimes desirable to have a permanent record of certain operations, as for example, of the entrance of trains into the several track sections at the remote stations. For this purpose I provide a graphic train recorder of the usual and standard form comprising a plurality of magnets each designated by the reference character 279 with an appropriate distinguishing exponent, one of these magnets being provided for each panel. Each magnet 279 is arranged to be energized when the associated relay $j^1$ is actuated to close its contact 263—264. This operation takes place, it will be remembered, when a train enters the corresponding section at the remote station and each magnet 279 is therefore energized when the corresponding section is occupied. Each of the magnets 279 may control a pen on the train recorder in accordance with the usual practice.

It is sometimes desirable for the operator in charge of the control station to be informed when a code is supplied to the line circuit from either the control station or remote station. This may be accomplished by means of the two lamps 280 and 281 which are controlled in part by a relay 282. The circuit for relay 282 may be traced from terminal B, through the winding of relay 282, wire 283, and front contact 89 of relay M^A to terminal C. Relay 282 is therefore de-energized when a code is being received from a remote station, and under these conditions, each operation of relay R^A in response to this code, supplies energy to lamp 280 over back contact 275 of relay R^A and back contact 284 of relay 282. The lamp 280 therefore flashes intermittently to follow the indication code being received from a remote station. When a control code is being delivered to the line circuit from station A, however, relay M^A is then energized and relay 282 is also energized so that front contact 284 of this relay is closed. Under these conditions, the intermittent operation of the relay R^A, as a result of the control code being delivered to the line circuit, lights lamp 281 intermittently to follow this control code.

In describing my invention, I have illustrated only two panels at the control station but this particular number is not essential. In this connection, it should be pointed out that for any number of panels at the control station with their associated switching devices E, no additional equipment in the coding apparatus A^A is necessary, the coding units g being operated selectively to combine the various code elements to produce complete codes in accordance with the connections of the contacts of the code selecting relays Q. It should also be particularly mentioned that the traffic governing devices at the remote stations may be controlled by selectors in any suitable manner and that the arrangement of apparatus shown in Fig. 3 is by way of illustration only, and should not be construed to limit my invention in any particular.

Although I have herein shown and described only one form of remote controlling apparatus embodying my invention, it is understood that various changes and modifications may be made therein within the scope of the appended claims without departing from the spirit and scope of my invention.

Having thus described my invention, what I claim is:

1. Remote controlling apparatus comprising a normally closed line circuit connecting a plurality of stations and including in series a line relay at each station, a code transmitting contact at each station, and means at each station effective only if the associated line relay is energized for at times shunting said line circuit at said station through the associated line relay and code transmitting contact and for opening said line circuit beyond said station.

2. Remote controlling apparatus comprising a normally closed line circuit connecting a plurality of stations and including in series a line relay at each station, a code transmitting contact at each station, means at each station effective only if the associated line relay is energized for at times shunting said line circuit at said station through the associated line relay and code transmitting contact and for opening said line circuit beyond said station, means for subsequently opening said code transmitting contact to de-energize said line relay, means operating at the expiration of a time interval following de-energization of said line relay to re-close said code transmitting contact, and means operating if said line relay subsequently picks up to operate said contact to impress a code upon at least a portion of said line circuit.

3. Remote controlling apparatus comprising a normally closed line circuit extending from a control station to a plurality of remote stations and including in series a line relay at each station, a code transmitting contact at each station, means for each station effective if the associated line relay is energized for at times shunting said line circuit at said station through the associated line relay and transmitting contact and for opening the portion of the line circuit extending to all stations more remote from the control station, means for subsequently operating said transmitting contact to deliver a code to the remaining portion of said line circuit if and only if said remaining portion is closed to said control station, and means operating upon the completion of said code to restore the normal line circuit.

4. Remote controlling apparatus comprising a normally closed line circuit extending from a control station to a plurality of remote stations and including in series a line relay at each station, a delay relay for each remote station arranged to be energized when the corresponding line relay is de-energized, a code transmitting contact at each station, means for each station effective only if the associated line relay is energized and the associated delay relay is released for at times shunting said line circuit at said station through the associated transmitting contact and for opening the portion of the line circuit extending to all stations more remote from the control station, means for subsequently operating said transmitting contact to deliver a code to the remaining portion of the line circuit provided said remaining portion is closed to the control station, and means operating upon the completion of such code to restore the normal line circuit.

5. Remote controlling apparatus comprising a normally closed line circuit extending from a control station to a plurality of remote stations and including in series a line relay at each station, storing contacts at each remote station, means operating when a storing contact is closed at any remote station to deliver a code to the portion of the line circuit between such remote station and the control station and including the line relay at such control station, means effective when any station is delivering a code to the line circuit to open the portion of the line circuit extending to all stations more remote from the control station, and means for preventing the delivery of code from each remote station until the associated line relay is energized and the portion of the line circuit between such station and the control station is closed.

6. Remote controlling apparatus comprising a normally closed line circuit extending from a control station to a plurality of remote stations and including in series a line relay at each station, means at the control station effective only when the associated line relay is energized and the line circuit is closed for delivering a code to the line circuit, means at the control station for opening said line to all remote stations for a time interval preparatory to delivering such code, and selectors at each remote station controlled by the associated line relay.

7. Remote controlling apparatus comprising a normally closed line circuit extending from a control station to a plurality of remote stations and including in series a line relay at each station, a sectionalizing relay at each remote station having a back contact included in said line circuit, a code transmitting contact at each remote station, means operating when any sectionalizing relay is energized to shunt the line circuit at the corresponding station through the associated code transmitting contact and the associated line relay, and to open the portion of the line circuit extending to all stations more remote from said control station, a delay relay at each remote station arranged to be energized when the associated line relay is de-energized, and a circuit for each sectionalizing relay controlled by a back contact of the associated delay relay and by a front contact of the associated line relay.

8. Remote controlling apparatus comprising a plurality of stations each provided with a transmitting relay, a line relay, a sectionalizing relay, a delay relay, and a motor relay; a normally closed line circuit connecting all such stations and including a back contact of each sectionalizing relay and the winding of each line relay in series; a shunt path across said line circuit at each station including a front contact of the corresponding sectionalizing relay, a back contact of the corresponding transmitting relay, and the winding of the corresponding line relay; a circuit for each delay relay including a back contact of the corresponding line relay, a storing contact at each station; a pick-up circuit for each sectionalizing relay including an associated storing contact, a back contact of the associated delay relay, and a front contact of the associated line relay, a stick circuit for said sectionalizing relay including a front contact of the associated motor relay; a pick-up circuit for each motor relay including a front contact of the associated delay relay, a front contact of the associated line relay, and a front contact of the associated sectionalizing relay; a stick circuit for each motor relay including a front contact of the associated sectionalizing relay; a pick-up circuit for each said transmitting relay including a front contact of the associated line relay, a back contact of the associated delay relay, and a front contact of the associated sectionalizing relay; an operating circuit for each transmitting relay including a front contact of the associated sectionalizing relay and a front contact of the associated motor relay, and means operating when the motor relay at any station is energized to periodically interrupt the operating circuit for the transmitting relay at that station in accordance with a predetermined code.

9. In combination with a line circuit, a plurality of coding units each arranged when operated to deliver to the line circuit a distinctive code element, a plurality of code selecting relays, manually controlled means for energizing a selected one of said code selecting relays, and means effective when any one of said code selecting relays is energized to operate selected ones of said coding units in a selected order depending upon which relay is energized to deliver a complete code to the line circuit.

10. Coding apparatus comprising a plurality of coding units each arranged when operated to transmit a distinctive code element, a plurality of manually controlled contacts, a stepping contactor, means effective when any one of said contacts is operated to actuate a predetermined one of said coding units, means for advancing said stepping contactor one position upon the operation of a coding unit, and means effective at the end of the operation of a coding unit to start the operation of the coding unit corresponding to the new position of said stepping contactor and to the condition of said manually controlled contacts.

11. Coding apparatus comprising a plurality of coding units each having a delivery magnet and operating when such delivery magnet is energized to transmit a distinctive code element, a delivery contact for each unit arranged to be open only when the corresponding unit is operating, a stepping contactor having an operating magnet and arranged to be advanced when said operating magnet is energized and then de-energized, a circuit for said operating magnet including all of said delivery contacts in series, and manually controlled means including contacts of said stepping contactor for energizing selected ones of said delivery magnets in a predetermined order.

12. Coding apparatus comprising a plurality of coding units each having a delivery magnet and operating when such delivery magnet is energized to transmit a distinctive code element, a delivery contact for each unit arranged to be open only when the corresponding unit is operating, a stepping contactor having a series of contacts one for each said delivery magnet and having an operating magnet arranged when energized and then de-energized to open one contact of the contactor and close the next contact in said series, means controlled by each contact in said series for energizing one of said delivery magnets provided said operating magnet is energized, and a manually controlled circuit for said operating magnet including all of said delivery contacts in series.

13. Coding apparatus comprising a plurality of coding units each having a delivery magnet and operating when such delivery magnet is energized to transmit a distinctive code element, a delivery contact for each unit arranged to be open only when the corresponding unit is operating, a stepping contactor having a series of contacts one for each said delivery magnet and having an operating magnet arranged when energized and then de-energized to open one contact of the contactor and close the next contact in said series, manually controlled means for preparing circuits for selected ones of said delivery magnets each such circuit being closed when a corresponding contact in said series is closed provided said operating magnet is energized, and a manually controlled circuit for said operating magnet including all of said delivery contacts in series.

14. Coding apparatus comprising a plurality of coding units each having a delivery magnet and each operating when the corresponding delivery magnet is energized to deliver a distinctive code element, a stepping contactor having a series of contacts, manually operable means for placing selected ones of said delivery magnets under the control of selected ones of said contacts, and manually controlled means for closing the contacts of said stepping contactor one at a time in a predetermined order.

15. Coding apparatus comprising a plurality of coding units each having a delivery magnet and each operating when the corresponding delivery magnet is energized to deliver a distinctive code element, a stepping contactor having a series of contacts, manually operable means for placing selected ones of said delivery magnets under the control of selected ones of said contacts, a master relay having normal and reverse positions, means controlled by a reverse contact of said master relay for closing the contacts of said stepping contactor one at a time in a predetermined order, manually controlled means for operating said master relay to its reverse position, and means controlled in part by said stepping contactor and operating after the delivery of a complete code to restore said master relay to its normal position.

16. Coding apparatus comprising a plurality of coding units each arranged when actuated to deliver a distinctive code element, a master relay having normal and reverse positions, a manually controlled lever, means controlled by a reverse contact of said master relay for actuating selected ones of said coding units in a predetermined order depending upon the position of said lever to deliver a complete code, means controlled by said lever for operating said master relay to its reverse position, and means effective after the completion of said complete code to restore the master relay to its normal position.

17. In combination, a plurality of movable levers, a plurality of code selecting relays, means effective when one of said levers is moved to energize a selected one of said relays, a plurality of coding units each arranged when actuated to deliver a distinctive code element, means operating upon the movement of any one of said levers to actuate selected ones of said coding units in a predetermined order depending upon which of said code selecting relays is energized, and means operating upon the delivery of a complete code to de-energize said code selecting relay.

18. In combination, a manually operable switching device, a master relay, coding apparatus comprising a code selecting relay and operating when the master relay is reversed to transmit a predetermined code provided the code selecting relay is energized, a winding, means effective if said switching device is operated when said master relay is in its normal position to energize said code selecting relay and said winding, a contact arranged to be closed only when said winding is energized, means controlled by said contact for reversing said master relay, and means operating at the conclusion of the code delivered by said coding apparatus to restore said master relay to its normal position and to deenergize said winding and said code selecting relay.

19. In combination, a manually operable switching device capable of assuming a plurality of positions, a motor, means for starting said motor when said switching device is moved from any position to another position, a plurality of code selecting relays one for each position of said switching device, means effective when said motor has attained normal speed to energize a selected one of said code selecting relays depending upon the position of said switching device, a plurality of coding units driven by said motor and each arranged when actuated to deliver a distinctive code unit, means effective when a code selecting relay is energized to actuate selected ones of said coding units in a selected order depending upon which code selecting relay is energized, and means operating when said selected coding units have all been actuated to stop said motor and to de-energize said code selecting relay.

20. In combination, a line circuit, a plurality of manually operable switching devices each capable of assuming a plurality of positions, a winding associated with each said switching device, a normally closed contact on each said switching device arranged to be opened when the device is operated to a new position and to subsequently remain open until the associated winding has been energized and de-energized, a locking relay, a normally closed circuit for said locking relay including the contacts in series of all of said switching devices, coding apparatus set into operation when said locking relay is de-energized by operation of one of said switching devices for delivering to said line circuit a distinctive code depending upon which device has been operated and for reversing the winding associated with such device, and means operating at the conclusion of such code to de-energize said winding.

21. In combination, a line circuit, a series of manually operable devices each having a first and second contacts and a finger normally engaging said first contact, means effective when any device is operated to move the associated finger away from engagement with the first contact and into engagement with said second contact, a latch for each device for subsequently holding said finger in engagement with said second contact, a winding associated with each said device, an armature for each device arranged to release said latch when the corresponding winding is energized but to prevent the return of the finger to engagement with said first contact until the winding becomes energized, a contact member on each said armature engaging the corresponding finger when the associated winding is energized, a locking relay having one terminal connected with one terminal of a source of energy, means for connecting the other terminal of said source with the finger of the first device in said series, through a control contact, means for connecting the first contact of each device with the finger of the next device in said series, means for connecting the first contact of the last device in said series with the free terminal of said locking relay, a plurality of code selecting relays each having one terminal connected with said one terminal of said source, means for connecting the second contact of each device through the associated said winding with the free terminal of a distinctive one of said code selecting relays depending upon the position of the associated device, coding apparatus set into operation when said locking relay is de-energized to deliver to said line circuit a distinctive code depending upon which code selecting relay is energized, means for opening said control contact when any code is being delivered to the line circuit, an additional contact normally closed but arranged to be opened for a brief interval at the conclusion of each code, and means for connecting said other terminal of the source with the contact member on the armature of each said device through said additional contact.

22. In combination, a line circuit connecting a control station with a remote station, a railway switch at said remote station, a railway signal governing traffic over said switch, a first manually operable lever at said control station arranged to deliver to said line circuit a first code when the lever is moved to one position and a second code when said lever is moved to a second position, means at said remote station for moving said switch to its normal or its reverse position according as said first or said second code is supplied to said line circuit, a second manually operable lever, means for delivering a third code to said line circuit when said second lever is moved to a first position, means at said remote station responsive to said third code for clearing said signal, means effective when said second lever is moved to a second position to deliver to said line circuit said first or said second code according as said first lever then occupies its first or its second position, and means at said remote station effective if either said first or said second code is delivered to said line wire when said signal is clear to restore the signal to its stop position.

23. In combination, two railway traffic governing devices, a first and a second manually controlled contacts, means for operating one said device to one position when said first contact is operated and to another position when the second contact is operated, a third manually controlled contact, means for moving said second device to a first position when said third contact is operated, means for subsequently holding said second device in such first position independently of said third contact, and means for moving said second device to a second position when either said first or said second contact is operated.

24. In combination, a railway switch and a signal governing traffic over such switch, a first and a second manually controlled contacts, means for operating said switch to its normal or its reverse position according as said first or said second contact is closed, a normally closed contact arranged to be opened for a brief interval when either said first or said second contact is operated, a third manually controlled contact, means for moving said signal to its proceed position when said third contact is operated, and means for subsequently maintaining said signal in its proceed position until said normally closed contact opens.

25. In combination, a normally closed line circuit connecting a control station and a plurality of remote stations, manually controlled means at the control station for at times periodically interrupting said line circuit to produce selected control codes, governing devices at each remote station selectively controlled by such control codes, means at each remote station for at times periodically interrupting said line circuit to produce indication codes, indication devices at the control station selectively responsive to said indication codes, a normally de-energized relay at the control station arranged to be energized when control codes are being delivered to the line circuit from said control station, two lamps, and means for lighting one lamp or the other according as said relay is energized or de-energized during each interruption of the line circuit to give visual indication of the code supplied to the line circuit and the origin of such code.

26. In combination, a manually operable switching device, a stepping contactor, a plurality of coding units each arranged when operated to transmit a distinctive code element, means controlled by said stepping contactor and by said switching device for at times operating selected ones of said units in a selected order to transmit a complete code, means for advancing said contactor one position for each element of said code, and means effective upon an interruption of said code to restore said contactor to its normal position.

27. In combination, a manually operable switching device, a stepping contactor, a plurality of coding units each arranged when operated to transmit a distinctive code element, means controlled by said stepping contactor and by said switching device for at times operating selected ones of said units in a selected order to transmit a complete code, means for advancing said stepping contactor one position for each element of said code, a reset relay arranged to be energized while said code is being transmitted, and means effective if said relay becomes de-energized before the completion of said code to restore the stepping contactor to its normal position.

28. Remote contacting apparatus comprising a normally closed line circuit extending from a control station to a plurality of remote stations and including in series a line relay at each station, a delay relay at each station arranged to be energized when the associated line relay is de-energized, transmitting apparatus at each station, means at each station effective at times to set the corresponding transmitting apparatus into operation provided the associated line relay is energized and the associated delay relay is de-energized, a normally de-energized sectionalizing relay at each remote station arranged when energized to open the portion of the line circuit extending to all stations more remote from the control station and to shunt the portion of the line circuit extending to the control station through the associated line relay, means for energizing each sectionalizing relay when the associated transmitting apparatus is set into operation, and means controlled by each transmitting apparatus for delivering a code to the portion of the line circuit extending to the control station provided the associated line relay, delay relay and sectionalizing relays are all energized.

29. Remote controlling apparatus comprising a normally closed line circuit extending from a control station to a plurality of other stations and including in series a normally energized line relay at each said other station, a code transmitting contact at each such other station, a sectionalizing relay at each such other station, a pick-up circuit for each sectionalizing relay arranged to be closed only if the associated line relay is steadily energized, holding means for subsequently maintaining said sectionalizing relay energized, means controlled by each said sectionalizing relay for closing the portion of the line circuit extending from the control station through the line relay and transmitting contact associated with such sectionalizing relay and for simultaneously deenergizing the line relays at all more remote stations, and means effective when a sectionalizing relay is energized to operate the associated transmitting contact to deliver a code to the control station.

30. Remote controlling apparatus comprising a normally closed line circuit extending from a control station to a plurality of other stations and including in series a normally energized line relay at each said other station, a code transmitting contact at each such other station, a sectionalizing relay at each such other station, a pick-up circuit for each sectionalizing relay arranged to be closed only if the associated line relay is steadily energized, means controlled by each said sectionalizing relay for closing the portion of the line circuit extending from the control station through the line relay and transmitting contact associated with such sectionalizing relay and for simultaneously deenergizing the line relays at all more remote stations, means effective when a sectionalizing relay is energized to operate the associated transmitting contact to deliver a code to the control station, and code receiving means at the control station controlled by said line circuit.

31. Remote controlling apparatus comprising a plurality of independent line stations connected with an office through a line circuit including in series a line relay at each station, a code transmitting contact at each said station, a slow-acting sectionalizing relay at each station arranged when energized to close the portion of the line circuit extending to the office through the associated line relay and transmitting contact and to disconnect the remainder of the line circuit from such portion, a pick-up circuit for each sectionalizing relay, means effective upon the energization of each sectionalizing relay to open the corresponding transmitting contact to deenergize the line relay at that station, means operating when the line relay releases to deenergize the sectionalizing relay and close the transmitting contact at the associated station, and holding means for said sectionalizing relay set into operation if the corresponding line relay picks up before the sectionalizing relay releases.

32. In a remote control system, the combination with a line circuit, of a transmitting contact and a line relay included in said line circuit, a second relay, means effective when said second relay is energized to operate said transmitting contact to cause intermittent interruptions of said line circuit, a pick-up circuit for said second relay, means for opening said pick-up circuit when said line relay releases and for subsequently holding said pick-up circuit open after the line relay next becomes energized, and a holding circuit for said second relay closed only when the line relay becomes energized within a predetermined time after the closing of the line circuit by said transmitting contact.

33. In a remote control system the combination with a line circuit, of a transmitting contact and a normally energized line relay included in series with said line circuit, a second relay, means effective when said second relay is energized to operate said transmitting contact to cause intermittent interruptions of said line circuit, a pick-up circuit for said second relay including a front contact of said line relay, and holding means for maintaining said second relay energized after the deenergization of said line relay during the first interruption of the line circuit provided the line relay again becomes energized within a predetermined time after the conclusion of said first interruption.

34. In a remote control system the combination with a line circuit, of a normally energized line relay included in said line circuit, a transmitting relay having a back contact in said line circuit, a second relay, a slow-acting relay controlled by a back contact of said line relay, a pick-up circuit for said second relay including a front contact of said line relay and a back contact of said slow-acting relay, means effective when said second relay is energized to operate said transmitting relay to intermittently open said line circuit, and holding means for maintaining said second relay energized after the deenergization of said line relay during the first interruption of the line circuit provided the line relay again becomes energized within a predetermined time after the conclusion of said first interruption.

35. In a remote control system comprising two stations connected by line wires, independent transmitting means at each station for delivering series of code elements to said line wires, means at one station for imparting a particular character to the first element of each such series originating at that station, and means at the other station responsive to a code element of said particular character to disable the transmitting means at such other station until the completion of the code then being delivered to the line wires.

36. In a remote control system comprising an office and a plurality of stations connected by line wires, transmitting means at each station for delivering a series of code elements to the line wires on the office side of such station and for disconnecting the stations more remote from the office, transmitting means at the office for delivering to said line wires a series of code elements the first of which has a particular character different from the character of corresponding elements of the series originating at the stations, and means at each station responsive to a first code element of said particular character in said line wires to disable the associated transmitting means until the completion of the series of code elements then being transmitted.

37. In combination, in a remote control system, an office and a plurality of stations connected by line wires, transmitting means at the office for supplying to said line wires a series of code elements the first of which invariably has a particular character, sectionalizing means at each station for at times disconnecting all more remote stations from the line wires leading to the office and for delivering a code element of said particular character to the line wires leading to the disconnected stations, transmitting means at each station effective when the corresponding sectionalizing means operates to deliver to the line wires leading to the office a series of code elements the first of which has a character different from said particular character, and means effective during the first element of a code transmitted from a station provided such element has said particular character imparted to it to prevent further operation of said transmitting means and to reconnect the line wires from the office to the stations more remote.

38. In combination, in a remote control system, an office and a plurality of stations connected by line wires, transmitting means at the office for supplying to said line wires a series of code elements the first of which invariably has a particular character, sectionalizing means at each station for at times disconnecting all more remote stations from the line wires leading to the office and for delivering a code element of said particular character to the line wires leading to the disconnected stations, transmitting means at each station effective when the corresponding sectionalizing means operates to deliver to the line wires leading to the office a series of code elements the first of which has a character different from said particular character, and means effective during the first element of a code transmitted from a station provided such element has said particular character imparted to it to prevent further operation of said transmitting means and to restore the associated sectionalizing means to its original condition.

39. In combination in a remote control system, an office and a plurality of stations connected in series by line wires, transmitting means at the office for delivering to said line wires a signal having a plurality of elements the first of which invariably has a particular character, transmitting means at each station for delivering to the line wires between such station and the office a signal having a plurality of elements the first of which has a different character from said particular character and for delivering to the line wires leading to stations more remote an element having said particular character, and means at each station for preventing operation of the associated transmitting means in response to a first element of said particular character.

40. In combination, in a remote control system, comprising an office and a plurality of stations connected by line wires, means for transmitting multiple element signals in either direction between said office and any station over said line wires, and means for preventing interference between signals originating at the office and the stations comprising means for imparting a particular character to the first element of each signal originating at said office, means at each station for imparting a different character to the first element of each signal transmitted from such station to the line wires leading to the office and for delivering an element of said particular character to the line wires leading to stations more remote, and means at each station for preventing transmission of a signal from said station in response to an element of said particular character.

41. A remote control system comprising an office and a plurality of stations connected by line wires, transmitting means at the office and at each station for supplying multiple element signals having long and short elements to said line wires, means for making long the first element of each signal transmitted from the office, means at each station for making long the first element of each signal produced by the associated transmitter in the line wires leading to more remote stations but not in the line wires leading to the office, and means at each station responsive to a long first element in the line wires to prevent operation of the associated transmitter.

42. A remote control system comprising an office and a plurality of stations connected in series by a normally closed line circuit, transmitting means at the office and at each station for interrupting said line circuit to produce multiple element signals having long and short elements, means for making long the first element of each signal transmitted from the office, means at each station for making long the first element of each signal produced by the associated transmitter in the portion of the line circuit leading to more remote stations but not in the portion of the line circuit leading to the office, and means at each station responsive to a long first element in the line circuit to prevent operation of the associated transmitting means until said line circuit to such station is again steadily closed.

43. Code transmitting apparatus for a system of remote control comprising a plurality of contacts, a plurality of devices each arranged when actuated to transmit a distinctive code element, and means effective when any one of said contacts is operated to actuate said devices selectively in a predetermined order depending upon which contact is operated to form a complete code.

44. Code transmitting apparatus for a system of remote control comprising a plurality of devices each arranged when actuated to transmit a distinctive code element, a plurality of code setting relays, manually controlled means for energizing said relays selectively, and means effective when any one of said relays is energized to actuate said devices selectively in a predetermined order depending upon which relay is energized to form a complete code.

45. Transmitting apparatus for a remote control system comprising a plurality of units each arranged when actuated to transmit a distinctive code element, manually controlled means for actuating said units selectively in selected order to produce complete codes, a plurality of devices each requiring a definite time interval for its operation, means for selectively operating said devices in accordance with said complete codes, and means operating at the conclusion of each such code for preventing the transmission of another code for a time greater than said time interval.

46. A remote control system for transmitting distinctive messages from an office to a station comprising a plurality of similar control levers at said office each having at least two control positions in each of which a distinctive control contact is closed, a key associated with each lever and effective when operated momentarily to initiate the transmission to said station of a code message having certain characteristics identifying the particular key operated, and other characteristics determined by the closed control contact of the associated lever.

47. In combination with a line circuit, code generating means arranged when operated to produce a code, a transmitter relay for controlling said line circuit, means effective if and only if said code generating means is at rest for causing a preliminary operation of said transmitting relay, means responsive to said preliminary operation of said transmitter relay to operate said code generating means, and means for subsequently operating said transmitter relay in response to the code produced by said generating means.

48. In combination with an office and a plurality of stations, a plurality of line relays one at the office and one at each station, a line circuit including all said relays in series, means for transmitting codes to at least a portion of said line circuit from said office or from any station, and code receiving means controlled by each line relay.

49. In a centralized traffic control system for railroads, a control office, a field station provided with a traffic governing device, a communication system connecting said office and said station and capable of operation to transmit indications from said station to said office, a first relay at said station, means controlled by said device for picking up said first relay, a starting circuit for initiating operation of said communication system and including a front contact of said first relay, a normally deenergized second relay included in said communication system and arranged to be energized when said system is transmitting an indication from said station to said office, and a holding circuit for said first relay including a back contact of said second relay.

50. In a centralized traffic control system for railroads, a control office, a field station provided with a traffic governing device, a communication system connecting said office and said station and capable of operation to transmit indications from said station to said office, a first relay at said station, means controlled by said device for picking up said first relay, a second relay included in said communication system, a holding circuit for said first relay including a back contact of said second relay, a starting circuit for initiating operation of said communication system and including a front contact of said first relay, and means effective when said system is transmitting an indication from said station to said office to energize said second relay.

51. In a centralized traffic control system for railroads, a control office, a field station provided with a traffic governing device, a communication system connecting said office and said station and capable of operation to transmit indications from said station to said office, a first relay at said station, means responsive to a change in the condition of said device for picking up said first relay, a starting circuit for initiating operation of said communication system and including a front contact of said first relay, means for selectively controlling said communication system to transmit from said station to said office a distinctive indication in accordance with the condition of said device, a normally deenergized second relay included in said communication system and arranged to be energized when said system is transmitting an indication from said station to said office, and a holding circuit for said first relay including a back contact of said second relay.

52. In combination with two traffic governing devices, a first relay for controlling one said device, a second relay for controlling the other said device, manually controlled means at a remote point for transmitting distinctive signals, means selectively responsive to one said signal to pick up said first relay, a stick circuit for said first relay, means selectively responsive to another said signal to energize said second relay, and other means selectively responsive to said other signal to open a contact in said stick circuit.

53. In a centralized traffic control system for railroads, a pair of selectors individually controlled from a remote point, a first relay having a pick-up circuit controlled by one selector, a trip relay, a stick circuit for said first relay controlled by said trip relay, a second relay, means controlled by the other said selector for energizing said second relay and said trip relay, and traffic governing devices separately controlled by said first and said second relays respectively.

54. In a centralized traffic control system for railways, an office and a station connected by a line circuit, independent means at the office and the station for delivering to the line circuit a series of signal elements, means for invariably prolonging the first of a series of elements delivered to the line circuit from the office, and means at the station responsive to a long first signal element to prevent operation of the transmitting means at the station.

55. In combination, a normally closed line circuit connecting a control station and a plurality of remote stations, manually controlled means at the control station for at times periodically interrupting said line circuit to produce selected control codes, governing devices at each remote station selectively controlled by such control codes, means at each remote station for at times periodically interrupting said line circuit to produce indication codes, indication devices at the control station selectively responsive to said indication codes, a normally deenergized relay at the control station arranged to be energized when control codes are being delivered to the line circuit from said control station, two lamps, and means for lighting one lamp or the other according as said relay is energized or deenergized during the transmission of each code to the line circuit to give a visual indication of the presence of said code in said line circuit and of the origin of such code.

56. A communication system comprising, a line circuit extending from a control station through a plurality of way stations in series, means for signaling over said circuit from the control station to said way stations, a sectionalizing relay at each way station having a normally closed back contact in the portion of the line circuit leading to way stations more remote from the control station and having a normally open front contact adapted when closed to complete the portion of the line circuit leading to the control station, means at each way station for at times energizing the sectionalizing relay at said way station, and means for signaling from said way station to the control station over the last named portion of the line circuit completed by the energization of said sectionalizing relay.

57. A communication system comprising, a line circuit extending from a control station through a plurality of way stations in series and including a line relay at each station, a normally inactive transmitting contact at each station, a sectionalizing relay at each way station having a normally closed back contact in the portion of the line circuit leading to way stations more remote from the control station and having a normally open front contact adapted when closed to complete the portion of the line circuit leading to the control station, means at each way station for at times energizing the sectionalizing relay at said way station to render available a portion of the line circuit including the transmitting contact at said station and the line relays at the control station and at intervening way stations but excluding those at more remote stations, means for actuating the transmitting contact at said way station to transmit signals from the way station to actuate the line relay at said control station, and means for at times actuating the transmitting contact at said control station to transmit signals to all of said way stations.

58. In combination with an office and a station connected by a line circuit, a railway switch at the station, a signal governing traffic over said switch, a movable switch lever and a movable signal lever at the office each having contacts closed selectively in accordance with the position of the corresponding lever, means including a circuit passing in series over contacts of both said levers for transmitting a first code to said line circuit, means including a circuit passing over contacts of said signal lever but not over contacts of said switch lever for transmitting a second code to said line circuit, means at the station responsive to said first code for controlling said switch, and means at the station responsive to said second code for controlling said signal.

59. In a system for dispatching traffic on railroads, the combination with a dispatcher's office and a plurality of stations, selecting means at each station operable to establish circuits selectively for the control of traffic controlling devices at that station, impulse means in the dispatcher's office for causing operation of said selecting means, a control lever in the dispatcher's office associated with each station, automatic means for rendering said impulse means effective to cause operation of the selecting means for any station only if said control lever associated with that station has been changed to a new position since the last operation of said corresponding selecting means, and means registering the changed conditions of the control levers irrespective of the number of said control levers which are changed simultaneously.

60. In combination, a central office, a plurality of field stations, a normally-at-rest selector type communication system connecting said central office and said field stations, a traffic controlling device at each field station, a control lever in said office for each traffic controlling device, a stick relay for each lever, means for picking up each said relay during movement of its associated lever from one active to another active position, a circuit including an active contact of a lever controlled by the associated stick relay for transmitting through the medium of said communication system, a control corresponding to the position then assumed by such lever to the corresponding traffic controlling device at the field station, and means for initiating said communication system from rest controllable by each of said stick relays.

61. In a selector type system for controlling railway traffic controlling devices and which is normally at rest; the combination with a plurality of field stations, each having a plurality of traffic controlling devices and a control office, of a lever in said office for each of said traffic controlling devices, a stick relay in said office for each lever, means for picking up each said relay during the movement of a lever for controlling a traffic controlling device at a way station from a position to close one active contact to a position to close another active contact, a circuit for transmitting a control to a particular traffic controlling device at a particular way station from its control lever including an active contact of such lever and controlled by the stick relay for such lever, and means for initiating said selector system controlled by each of said stick relays.

62. In a selector type system for controlling railway traffic controlling devices and which is normally at rest; the combination with a plurality of field stations, each having a plurality of traffic controlling devices and a control office, of a lever in said office for each of said traffic controlling devices, a stick relay in said office for each lever, means for picking up each said relay during the movement of a lever for controlling a traffic controlling device at a way station from a position to close one active contact to a position to close another active contact, a circuit for transmitting a control to a particular traffic controlling device at a particular way station from its control lever including an active contact of such lever and controlled by the stick relay for such lever, means for initiating said selector system controlled by each of said stick relays, and a stick circuit for each stick relay broken when the control for the traffic governing device has been transmitted.

63. In a remote control system of the code type, means for transmitting selectively any one of a plurality of codes comprising a plurality of relays one for each code and each controlling a plurality of contacts, a stepping device, a transmitting device, means to selectively energize any one of said relays and to set said stepping device into operation to connect each of the plurality of contacts controlled by the energized relay in turn with said transmitting device to produce a series of code elements, and means controlled by the stepping device to release the energized relay at the conclusion of a complete code.

64. In combination with an office and a plurality of line stations, a line circuit extending from said office through all said stations in series, transmitting means at each station, means controlled by the transmitting means at each station and including the portion of the line circuit extending from such station to the office for delivering codes originating at such station to the office, a checking relay at each station arranged to be energized when said line circuit portion is open between such station and the office but having a time interval sufficient to bridge the normal periods of closed circuit in said codes, and means at each station effective when said line circuit portion is closed between such station and the office and the corresponding checking relay is deenergized to initiate operation of the transmitting means at the corresponding station 65. In combination with an office, and a plurality of line stations, a line circuit extending from said office through all said stations in series, transmitting means at each station, means controlled by the transmitting means at each station and including the portion of the line circuit extending from such station to the office for delivering codes originating at such station to the office, a checking relay at each station arranged to be energized when said line circuit portion is open between such station and the office but having a time interval sufficient to bridge the normal periods of closed circuit in said codes, means at each station effective when said line circuit portion is closed between such station and the office and the corresponding checking relay is deenergized to initiate operation of the transmitting means at the corresponding station, and means effective only when said checking relay is energized for completing the operation of said transmitting means.

66. In combination with an office and a line station, means for transmitting from said office to said station control codes each containing a locking element of one character, receiving means at the station selectively responsive to such control codes, transmitting means at the station effective when operated to deliver to said office an indication code having a locking element of a different character from the locking element of said control codes, means for initiating the operation of said transmitting means at the station, and means requiring the locking element of the resultant code to be of said different character to continue the operation of said station transmitting means.

67. An OS-ing system for transmitting conditions of traffic from a plurality of points along a railway system to the dispatcher's office comprising, means located at each of such plurality of points for transmitting distinctive codes to the dispatcher's office over the same indicating circuit, means in the dispatcher's office for interpreting these codes, and lockout means for preventing only more distant way stations transmitting codes to the dispatcher's office when a particular way station is transmitting a code.

68. A train dispatching system comprising, a dispatcher's office, a plurality of code responsive relays in said dispatcher's office constructed to return to their normal condition after having been changed from normal by a partial code upon reception of a cancelling code, and an automatically-operated calling key located at a distant way station which if initiated will first transmit a cancelling code and then transmit a distinctive code of a character to actuate one of the code responsive relays in the dispatcher's office.

69. In a centralized traffic controlling system for railroads, a line circuit connecting a control office and a plurality of field stations; transmitting means at each of the field stations for impressing different codes on said line circuit; receiving means at the control office distinctively responsive to each of the codes impressed on said line circuit; and lockout means at each field station for preventing all other field stations from transmitting when that field station is transmitting, said lockout means at each field station being effective when that particular station starts to transmit for stopping the transmitter of any station more distant from the control office that may be operating and for restoring said receiving means in the control office to normal ready for the reception of a code from such station.

70. In a centralized traffic controlling system for railroads; a line circuit connecting a control office and a plurality of field stations; transmitting means at each of the field stations for transmitting different codes over said line circuit to the control office; receiving means at the control office distinctively responsive to each of the codes transmitted over said line circuit; a lockout relay at each field station for preventing the field stations more distant from the control office from transmitting when that field station is transmitting, said relay being effective when picked up; traffic controlled means for at times picking up said relay; and means governable from the control office for rendering said lockout relay ineffective.

71. In a centralized traffic controlling system for railroads; a line circuit connecting a control office and a plurality of field stations; transmitting means at each of the field stations for transmitting different codes over said line circuit to the control office; receiving means at the control office distinctively responsive to each of the codes transmitted over said line circuit; a starting relay at each field station for initiating said transmitting means at that station into operation when such starting relay is rendered effective; traffic controlled means for at times rendering said starting relay effective; and means governable from the control office for at times rendering said starting relay ineffective.

72. In a centralized traffic controlling system for railroads; a line circuit connecting a control office and a field station; transmitting means at the field station for transmitting codes over said line circuit to the control office; receiving means at the control office responsive to each of the codes transmitted over said line circuit; a starting relay at the station for initiating said transmitting means into operation when such starting relay is energized; traffic controlled means at the field station, means governed by said traffic control means for at times energizing said starting relay, and means operated from the control office for deenergizing said starting relay.

CLARENCE S. SNAVELY.